(12) United States Patent
Chen et al.

(10) Patent No.: US 10,601,682 B2
(45) Date of Patent: Mar. 24, 2020

(54) SERVICE AVAILABILITY MANAGEMENT METHOD, SERVICE AVAILABILITY MANAGEMENT APPARATUS, AND NETWORK FUNCTION VIRTUALIZATION ARCHITECTURE THEREOF

(71) Applicant: Huawei Technologies Co., Ltd., Shenzhen (CN)

(72) Inventors: Mingxiang Chen, Shenzhen (CN); Xuewen Gong, Shenzhen (CN); Shaoji Ni, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 126 days.

(21) Appl. No.: 15/813,413

(22) Filed: Nov. 15, 2017

(65) Prior Publication Data

US 2018/0077031 A1   Mar. 15, 2018

Related U.S. Application Data

(63) Continuation of application No. PCT/CN2015/093112, filed on Oct. 28, 2015.

(30) Foreign Application Priority Data

May 15, 2015   (CN) .......................... 2015 1 0250878

(51) Int. Cl.
*H04L 12/24*      (2006.01)
*H04L 29/08*      (2006.01)
(Continued)

(52) U.S. Cl.
CPC ...... *H04L 41/5041* (2013.01); *G06F 9/45558* (2013.01); *G06F 9/5072* (2013.01);
(Continued)

(58) Field of Classification Search
None
See application file for complete search history.

(56) References Cited

U.S. PATENT DOCUMENTS

| | | | |
|---|---|---|---|
| 7,894,459 B2 | 2/2011 | McDade et al. | |
| 2003/0135609 A1* | 7/2003 | Carlson | G06F 9/5011 709/224 |

(Continued)

FOREIGN PATENT DOCUMENTS

| | | |
|---|---|---|
| CN | 1570860 A | 1/2005 |
| CN | 101741609 A | 6/2010 |

(Continued)

OTHER PUBLICATIONS

ITU-T, "Part 3: Requirements and framework architecture of cloud infrastructure," FG Cloud TR Version 1.0 (Feb. 2012), Feb. 2012, 60 pages.

*Primary Examiner* — Philip J Chea
*Assistant Examiner* — Hassan A Khan
(74) *Attorney, Agent, or Firm* — Slater Matsil, LLP

(57) ABSTRACT

A method includes obtaining a service availability level of a to-be-deployed service; determining, based on an availability policy library and according to the service availability level of the to-be-deployed service, availability-related parameter information of a resource corresponding to the service availability level of the to-be-deployed service; and allocating and configuring the corresponding resource for the to-be-deployed service based on a resource information library and according to the availability-related parameter information of the resource corresponding to the service availability level of the to-be-deployed service, where the resource includes at least one of the following: an infrastructure resource, a non-HA software resource, or an HA software resource.

18 Claims, 11 Drawing Sheets

(51) Int. Cl.
  *H04L 12/26* (2006.01)
  *G06F 9/455* (2018.01)
  *G06F 9/50* (2006.01)
(52) U.S. Cl.
  CPC ............ *G06F 9/5077* (2013.01); *H04L 29/08* (2013.01); *H04L 41/0896* (2013.01); *H04L 41/5009* (2013.01); *H04L 41/5012* (2013.01); *H04L 41/5025* (2013.01); *H04L 41/5045* (2013.01); *H04L 41/5051* (2013.01); *H04L 43/0817* (2013.01); *H04L 67/10* (2013.01); *H04L 67/16* (2013.01); *G06F 2009/45595* (2013.01)

(56) References Cited

U.S. PATENT DOCUMENTS

| | | | | |
|---|---|---|---|---|
| 2004/0225952 | A1* | 11/2004 | Brown | ...................... G06F 8/20 |
| | | | | 714/819 |
| 2011/0138047 | A1* | 6/2011 | Brown | ................... G06Q 10/10 |
| | | | | 709/226 |
| 2013/0212285 | A1* | 8/2013 | Hoffmann | ........... H04L 12/4641 |
| | | | | 709/226 |
| 2014/0108584 | A1 | 4/2014 | Lu et al. | |
| 2014/0278808 | A1* | 9/2014 | Iyoob | ................ G06Q 30/0206 |
| | | | | 705/7.35 |
| 2016/0335111 | A1* | 11/2016 | Bruun | ................ G06F 9/45558 |
| 2017/0171032 | A1* | 6/2017 | Chastain | ............... H04L 41/145 |

FOREIGN PATENT DOCUMENTS

| | | |
|---|---|---|
| CN | 102801792 A | 11/2012 |
| CN | 104009939 A | 8/2014 |
| CN | 104050045 A | 9/2014 |
| CN | 104134122 A | 11/2014 |
| CN | 103168445 B | 3/2017 |
| EP | 1465073 A2 | 10/2004 |
| EP | 1498813 A2 | 1/2005 |

* cited by examiner

US 10,601,682 B2

SERVICE AVAILABILITY MANAGEMENT METHOD, SERVICE AVAILABILITY MANAGEMENT APPARATUS, AND NETWORK FUNCTION VIRTUALIZATION ARCHITECTURE THEREOF

CROSS-REFERENCE TO RELATED APPLICATIONS

This application is a continuation of International Application No. PCT/CN2015/093112, filed on Oct. 28, 2015, which claims priority to Chinese Patent Application No. 201510250878.5, filed on May 15, 2015. The disclosures of the aforementioned applications are hereby incorporated by reference in their entireties.

TECHNICAL FIELD

The present invention relates to the communications field, and in particular, to a service availability management method, a service availability management apparatus, and a network function virtualization architecture thereof.

BACKGROUND

In 2012, an operator releases a network function virtualization (NFV) white paper, and announces that an NFV Industry Standard Group (ISG) is set up in the European Telecommunications Standards Institute (ETSI). The operator sets up the NFV ISG to define a network function virtualization requirement of the operator and a related technical report, and expects to implement some network functions in a general high-performance server, a general switch, and a general memory by using a virtualization technology of an Internet technology (IT) for reference. It is well-known that an NFV technology has its unique NFV standard architecture. In addition, to cope with future competition and challenges and avoid being pipelined, the operator complies with a current development trend of a virtualization technology, a cloud computing technology, and the like, and proposes a new NFV standard architecture.

With continuous development of communications technologies, in the new NFV standard architecture, the NFV technology is applied to diversified services, and services of different types differ in importance and a service requirement. Therefore, to reduce hardware deployment costs, the operator has different requirements for service availability levels of the services of different types. In the prior art, during system establishment, a static pool is divided in advance according to differentiated hardware (such as a physical host and a memory), and deployment is performed. In this way, during service deployment, for the service availability levels of the services of different types, corresponding hardware resources can be configured for services of corresponding types, so as to meet the requirements of the operator for the service availability levels of the services of different types.

It can be learned that in the prior art, resources are divided according to differentiated hardware. However, this is not an end-to-end division method, and a division granularity is large during resource division. Consequently, a service availability level that a resource allocated to a service of a corresponding type can actually provide is greatly different from a service availability level required by an operator, and service availability experience is poor.

SUMMARY

Embodiments of the present invention provide a service availability management method, a service availability management apparatus, and a network function virtualization architecture thereof, so as to resolve a problem that service availability experience is poor because a service availability level that a resource allocated to a service of a corresponding type can actually provide is greatly different from a service availability level required by an operator.

To achieve the foregoing objective, the following technical solutions are used in the embodiments of the present invention.

A first aspect of the embodiments of the present invention provides a service availability management method. The method includes obtaining a service availability level of a to-be-deployed service, where the service availability level is determined according to a service type of the to-be-deployed service, or the service availability level is determined according to a user type corresponding to the to-be-deployed service. The method also includes determining, based on an availability policy library and according to the service availability level of the to-be-deployed service, availability-related parameter information of a resource corresponding to the service availability level of the to-be-deployed service. The method also includes allocating and configuring, for the to-be-deployed service, the resource corresponding to the service availability level of the to-be-deployed service based on a resource information library and according to the availability-related parameter information of the resource corresponding to the service availability level of the to-be-deployed service. The availability policy library stores an availability policy. The availability policy includes at least one service availability level and availability-related parameter information of a resource corresponding to each service availability level. The resource information library stores availability-related parameter information of a system-configured resource. The resource includes at least one of the following: an infrastructure resource, a non-high availability HA software resource, or an HA software resource. The infrastructure resource includes a hardware resource, a virtualization platform, a virtual unit, and a virtual resource. The hardware resource includes a computing hardware resource, a storage hardware resource, and a network hardware resource; and the virtual resource includes a virtual computing resource, a virtual storage resource, and a virtual network resource.

With reference to the first aspect, in a possible implementation manner, before the allocating and configuring, for the to-be-deployed service, the resource corresponding to the service availability level of the to-be-deployed service based on a resource information library and according to the availability-related parameter information of the resource corresponding to the service availability level of the to-be-deployed service, the method further includes: obtaining specification-related parameter information of the resource, where the specification-related parameter information of the resource includes at least one of the following: a resource quantity or resource performance; and the allocating and configuring, for the to-be-deployed service, the resource corresponding to the service availability level of the to-be-deployed service based on a resource information library and according to the availability-related parameter information of the resource corresponding to the service availability level of the to-be-deployed service includes: allocating and configuring, for the to-be-deployed service, the resource corresponding to the service availability level of the to-be-deployed service based on the resource information library and according to the specification-related parameter information of the resource and the availability-related parameter information of the resource corresponding to the service availability level of the to-be-deployed service.

With reference to the first aspect, in a possible implementation manner, reliability of an infrastructure resource corresponding to a high service availability level is higher than reliability of an infrastructure resource corresponding to a low service availability level; reliability of a non-HA software resource corresponding to a high service availability level is higher than reliability of a non-HA software resource corresponding to a low service availability level; and a quantity of function types of an HA software resource corresponding to a high service availability level is greater than a quantity of function types of an HA software resource corresponding to a low service availability level, and/or performance of a function of an HA software resource corresponding to a high service availability level is better than performance of the same function of an HA software resource corresponding to a low service availability level; and the function types of the HA software resource include a fault detection function, a fault analysis function, a prediction and prevention function, an enhanced fault recovery function, a flow control function, a disaster recovery failover function, a data backup function, a software hitless upgrade function, and a software gray upgrade function.

With reference to the first aspect, in a possible implementation manner, availability-related parameter information of the infrastructure resource includes at least one of the following: a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource; availability-related parameter information of the non-HA software resource includes at least one of the following: a manufacturer of the non-HA software resource, a version of the non-HA software resource, a redundancy quantity or ratio of the non-HA software resource, or anti-affinity of the non-HA software resource; and the non-HA software resource includes a service chain, a virtualized network function VNF, and a virtualized network function component VNFC; and availability-related parameter information of the HA software resource includes at least one of the following: a function type of the HA software resource or function parameter configuration of the HA software resource.

With reference to the first aspect, in a possible implementation manner, the enhanced reliability feature of the hardware resource includes at least one of the following: a central processing unit CPU hot swap, a CPU enhanced fault detection and recovery function, a memory error checking and correction ECC check, a storage disk array RAID, power redundancy, or fan redundancy.

With reference to the first aspect, in a possible implementation manner, the availability policy library further stores a service candidate policy or degradation policy; and the method further includes: allocating and configuring a corresponding resource for the to-be-deployed service based on the resource information library and according to the service candidate policy or degradation policy when the availability-related parameter information that is of the system-configured resource and stored in the resource information library does not have parameter information matching the availability-related parameter information that is of the resource corresponding to the service availability level of the to-be-deployed service and determined based on the availability policy library.

A second aspect of the embodiments of the present invention provide a service availability management method. The method includes, when it is detected that an availability state of a deployed service changes or when information that affects an availability state of the deployed service is detected, performing, based on an availability policy library and a resource information library, end-to-end adjustment on a resource configured for the deployed service. The availability policy library stores an availability policy; the availability policy includes at least one service availability level and availability-related parameter information of a resource corresponding to each service availability level. The service availability level is determined according to a service type of the service, or the service availability level is determined according to a user type corresponding to the service. The resource information library stores availability-related parameter information of a system-configured resource; the resource includes at least one of the following: an infrastructure resource, a non-high availability HA software resource, or an HA software resource; the infrastructure resource includes a hardware resource, a virtualization platform, a virtual unit, and a virtual resource; the hardware resource includes a computing hardware resource, a storage hardware resource, and a network hardware resource; and the virtual resource includes a virtual computing resource, a virtual storage resource, and a virtual network resource.

With reference to the second aspect, in a possible implementation manner, reliability of an infrastructure resource corresponding to a high service availability level is higher than reliability of an infrastructure resource corresponding to a low service availability level; reliability of a non-HA software resource corresponding to a high service availability level is higher than reliability of a non-HA software resource corresponding to a low service availability level; and a quantity of function types of an HA software resource corresponding to a high service availability level is greater than a quantity of function types of an HA software resource corresponding to a low service availability level, and/or performance of a function of an HA software resource corresponding to a high service availability level is better than performance of the same function of an HA software resource corresponding to a low service availability level; and the function types of the HA software resource include a fault detection function, a fault analysis function, a prediction and prevention function, an enhanced fault recovery function, a flow control function, a disaster recovery failover function, a data backup function, a software hitless upgrade function, and a software gray upgrade function.

With reference to the second aspect, in a possible implementation manner, availability-related parameter information of the infrastructure resource includes at least one of the following: a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource; availability-related parameter information of the non-HA software resource includes at least one of the following: a manufacturer of the non-HA software resource, a version of the non-HA software resource, a redundancy quantity or ratio of the non-HA software resource, or anti-affinity of the non-HA software resource; and the non-HA software resource includes a service chain, a virtualized network function VNF, and a virtualized network function component VNFC; and availability-related parameter information of the HA software resource includes at least one of the following: a function type of the HA software resource or function parameter configuration of the HA software resource.

With reference to the second aspect, in a possible implementation manner, the enhanced reliability feature of the hardware resource includes at least one of the following: a central processing unit CPU hot swap, a CPU enhanced fault detection and recovery function, a memory error checking and correction ECC check, a storage disk array RAID, power redundancy, or fan redundancy.

With reference to the second aspect, in a possible implementation manner, that an availability state of a deployed service changes includes at least one of the following: a key performance indicator KPI of the deployed service changes, where that a KPI of the deployed service changes includes at least one of the following: a service flow of the deployed service changes, a service user quantity of the deployed service changes, a service ratio of the deployed service changes, a service success rate of the deployed service changes, a service access delay of the deployed service changes, or a service processing time of the deployed service changes; and the information that affects the availability state of the deployed service includes: a system resource changes, where that a system resource changes includes at least one of the following: the non-HA software resource is upgraded, the HA software resource is upgraded, a new infrastructure resource is added, the infrastructure resource encounters a fault, a new non-HA software resource is added, a new HA software resource is added, parameter configuration of the HA software resource is adjusted, a network packet loss rate changes, or a network delay changes.

A third aspect of the embodiments of the present invention provides a service availability management apparatus, including an availability management module, an availability policy library, and a resource information library. The availability management module is configured to: obtain a service availability level of a to-be-deployed service, where the service availability level is determined according to a service type of the to-be-deployed service, or the service availability level is determined according to a user type corresponding to the to-be-deployed service; determine, based on the availability policy library and according to the service availability level of the to-be-deployed service, availability-related parameter information of a resource corresponding to the service availability level of the to-be-deployed service; and allocate and configure, for the to-be-deployed service, the resource corresponding to the service availability level of the to-be-deployed service based on the resource information library and according to the availability-related parameter information of the resource corresponding to the service availability level of the to-be-deployed service. The availability policy library is configured to store an availability policy, where the availability policy includes at least one service availability level and availability-related parameter information of a resource corresponding to each service availability level. The resource information library is configured to store availability-related parameter information of a system-configured resource; the resource includes at least one of the following: an infrastructure resource, a non-high availability HA software resource, or an HA software resource; the infrastructure resource includes a hardware resource, a virtualization platform, a virtual unit, and a virtual resource; the hardware resource includes a computing hardware resource, a storage hardware resource, and a network hardware resource; and the virtual resource includes a virtual computing resource, a virtual storage resource, and a virtual network resource.

With reference to the third aspect, in a possible implementation manner, the availability management module is further configured to obtain specification-related parameter information of the resource before allocating and configuring, for the to-be-deployed service, the resource corresponding to the service availability level of the to-be-deployed service based on the resource information library and according to the availability-related parameter information of the resource corresponding to the service availability level of the to-be-deployed service, where the specification-related parameter information of the resource includes at least one of the following: a resource quantity or resource performance; and the availability management module is specifically configured to allocate and configure, for the to-be-deployed service, the resource corresponding to the service availability level of the to-be-deployed service based on the resource information library and according to the specification-related parameter information of the resource and the availability-related parameter information of the resource corresponding to the service availability level of the to-be-deployed service.

With reference to the third aspect, in a possible implementation manner, reliability of an infrastructure resource corresponding to a high service availability level is higher than reliability of an infrastructure resource corresponding to a low service availability level; reliability of a non-HA software resource corresponding to a high service availability level is higher than reliability of a non-HA software resource corresponding to a low service availability level; and a quantity of function types of an HA software resource corresponding to a high service availability level is greater than a quantity of function types of an HA software resource corresponding to a low service availability level, and/or performance of a function of an HA software resource corresponding to a high service availability level is better than performance of the same function of an HA software resource corresponding to a low service availability level; and the function types of the HA software resource include a fault detection function, a fault analysis function, a prediction and prevention function, an enhanced fault recovery function, a flow control function, a disaster recovery failover function, a data backup function, a software hitless upgrade function, and a software gray upgrade function.

With reference to the third aspect, in a possible implementation manner, availability-related parameter information that is of the infrastructure resource and stored in the availability policy library or the resource information library includes at least one of the following: a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource; availability-related parameter information that is of the non-HA software resource and stored in the availability policy library or the resource information library includes at least one of the following: a manufacturer of the non-HA software resource, a version of the non-HA software resource, a redundancy quantity or ratio of the non-HA software resource, and anti-affinity of the non-HA software resource; and the non-HA software resource includes a service chain, a virtualized network function VNF, or a virtualized network function component VNFC; and availability-related parameter information that is of the HA software resource and stored in the availability policy library or the resource information library includes at least one of the following: a function type of the HA software resource or function parameter configuration of the HA software resource.

With reference to the third aspect, in a possible implementation manner, the enhanced reliability feature of the hardware resource includes at least one of the following: a central processing unit CPU hot swap, a CPU enhanced fault detection and recovery function, a memory error checking and correction ECC check, a storage disk array RAID, power redundancy, or fan redundancy.

With reference to the third aspect, in a possible implementation manner, the availability policy library is further configured to store a service candidate policy or degradation policy; and the availability management module is further configured to allocate and configure a corresponding resource for the to-be-deployed service based on the resource information library and according to the service candidate policy or degradation policy when the availability-related parameter information that is of the system-configured resource and stored in the resource information library does not have parameter information matching the availability-related parameter information that is of the resource corresponding to the service availability level of the to-be-deployed service and determined based on the availability policy library.

A fourth aspect of the embodiments of the present invention provides a service availability management apparatus, including an availability management module, an availability policy library, and a resource information library. The availability management module is configured to: when detecting that an availability state of a deployed service changes or when detecting information that affects an availability state of the deployed service, perform, based on the availability policy library and the resource information library, end-to-end adjustment on a resource configured for the deployed service. The availability policy library is configured to store an availability policy, where the availability policy includes at least one service availability level and availability-related parameter information of a resource corresponding to each service availability level; and the service availability level is determined according to a service type of the service, or the service availability level is determined according to a user type corresponding to the service. The resource information library is configured to store availability-related parameter information of a system-configured resource; the resource includes at least one of the following: an infrastructure resource, a non-high availability HA software resource, or an HA software resource; the infrastructure resource includes a hardware resource, a virtualization platform, a virtual unit, and a virtual resource; the hardware resource includes a computing hardware resource, a storage hardware resource, and a network hardware resource; and the virtual resource includes a virtual computing resource, a virtual storage resource, and a virtual network resource.

With reference to the fourth aspect, in a possible implementation manner, reliability of an infrastructure resource corresponding to a high service availability level is higher than reliability of an infrastructure resource corresponding to a low service availability level; reliability of a non-HA software resource corresponding to a high service availability level is higher than reliability of a non-HA software resource corresponding to a low service availability level; and a quantity of function types of an HA software resource corresponding to a high service availability level is greater than a quantity of function types of an HA software resource corresponding to a low service availability level, and/or performance of a function of an HA software resource corresponding to a high service availability level is better than performance of the same function of an HA software resource corresponding to a low service availability level; and the function types of the HA software resource include a fault detection function, a fault analysis function, a prediction and prevention function, an enhanced fault recovery function, a flow control function, a disaster recovery failover function, a data backup function, a software hitless upgrade function, and a software gray upgrade function.

With reference to the fourth aspect, in a possible implementation manner, availability-related parameter information that is of the infrastructure resource and stored in the availability policy library or the resource information library includes at least one of the following: a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource; availability-related parameter information that is of the non-HA software resource and stored in the availability policy library or the resource information library includes at least one of the following: a manufacturer of the non-HA software resource, a version of the non-HA software resource, a redundancy quantity or ratio of the non-HA software resource, or anti-affinity of the non-HA software resource; and the non-HA software resource includes a service chain, a virtualized network function VNF, and a virtualized network function component VNFC; and availability-related parameter information that is of the HA software resource and stored in the availability policy library or the resource information library includes at least one of the following: a function type of the HA software resource or function parameter configuration of the HA software resource.

With reference to the fourth aspect, in a possible implementation manner, the enhanced reliability feature of the hardware resource includes at least one of the following: a central processing unit CPU hot swap, a CPU enhanced fault detection and recovery function, a memory error checking and correction ECC check, a storage disk array RAID, power redundancy, or fan redundancy.

With reference to the fourth aspect or the foregoing possible implementation manners, in another possible implementation manner, that an availability state of a deployed service changes includes at least one of the following: a key performance indicator KPI of the deployed service changes, where that a KPI of the deployed service changes includes at least one of the following: a service flow of the deployed service changes, a service user quantity of the deployed service changes, a service ratio of the deployed service changes, a service success rate of the deployed service changes, a service access delay of the deployed service changes, or a service processing time of the deployed service changes; and the information that affects the availability state of the deployed service includes: a system resource changes, where that a system resource changes includes at least one of the following: the non-HA software resource is upgraded, the HA software resource is upgraded, a new infrastructure resource is added, the infrastructure resource encounters a fault, a new non-HA software resource is added, a new HA software resource is added, parameter configuration of the HA software resource is adjusted, a network packet loss rate changes, or a network delay changes.

A fifth aspect of the embodiments of the present invention provides a network function virtualization NFV architecture applied to the service availability management apparatus according to the third aspect or any one possible implementation manner of the third aspect or according to the fourth aspect or any one possible implementation manner of the fourth aspect. The NFV infrastructure includes an operation support system OSS/a business support system BSS, an element management system EMS, a virtualized network function VNF, a network function virtualization infrastructure NFVI, a network function virtualization orchestrator NFVO, a virtualized network function manager VNFM, and a virtualized infrastructure manager VIM. The NVF architecture also includes the availability management module, the availability policy library, and the resource information library are deployed in the NFVO, the availability management module, the availability policy library, and the resource information library are deployed in the VNFM, and the availability management module, the availability policy library, and the resource information library are deployed in the VIM; or the availability management module, the availability policy library, and the resource information library are deployed in the NFVO; or the availability management module, the availability policy library, and the resource information library are deployed in the VNFM; or the availability management module, the availability policy library, and the resource information library are deployed in the VIM.

According to the service availability management method, the service availability management apparatus, and the network function virtualization architecture thereof that are provided in an embodiment of the present invention, availability-related parameter information of a resource corresponding to a service availability level of a to-be-deployed service is determined from a preconfigured availability policy library according to the obtained service availability level of the to-be-deployed service, where the preconfigured availability policy library includes at least one service availability level and availability-related parameter information of a resource corresponding to each service availability level; and then the resource corresponding to the service availability level of the to-be-deployed service is allocated and configured for the to-be-deployed service based on a resource information library and according to the determined availability-related parameter information of the resource corresponding to the service availability level of the to-be-deployed service. The availability policy library may be used to allocate and configure, for the to-be-deployed service, at least one of the following corresponding resources: an infrastructure resource, a non-HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource.

Therefore, a service availability level that a resource allocated to a service of a corresponding type can actually provide is as consistent as possible with a service availability level required by an operator, and service availability experience is ensured to the greatest extent.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive another drawing from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
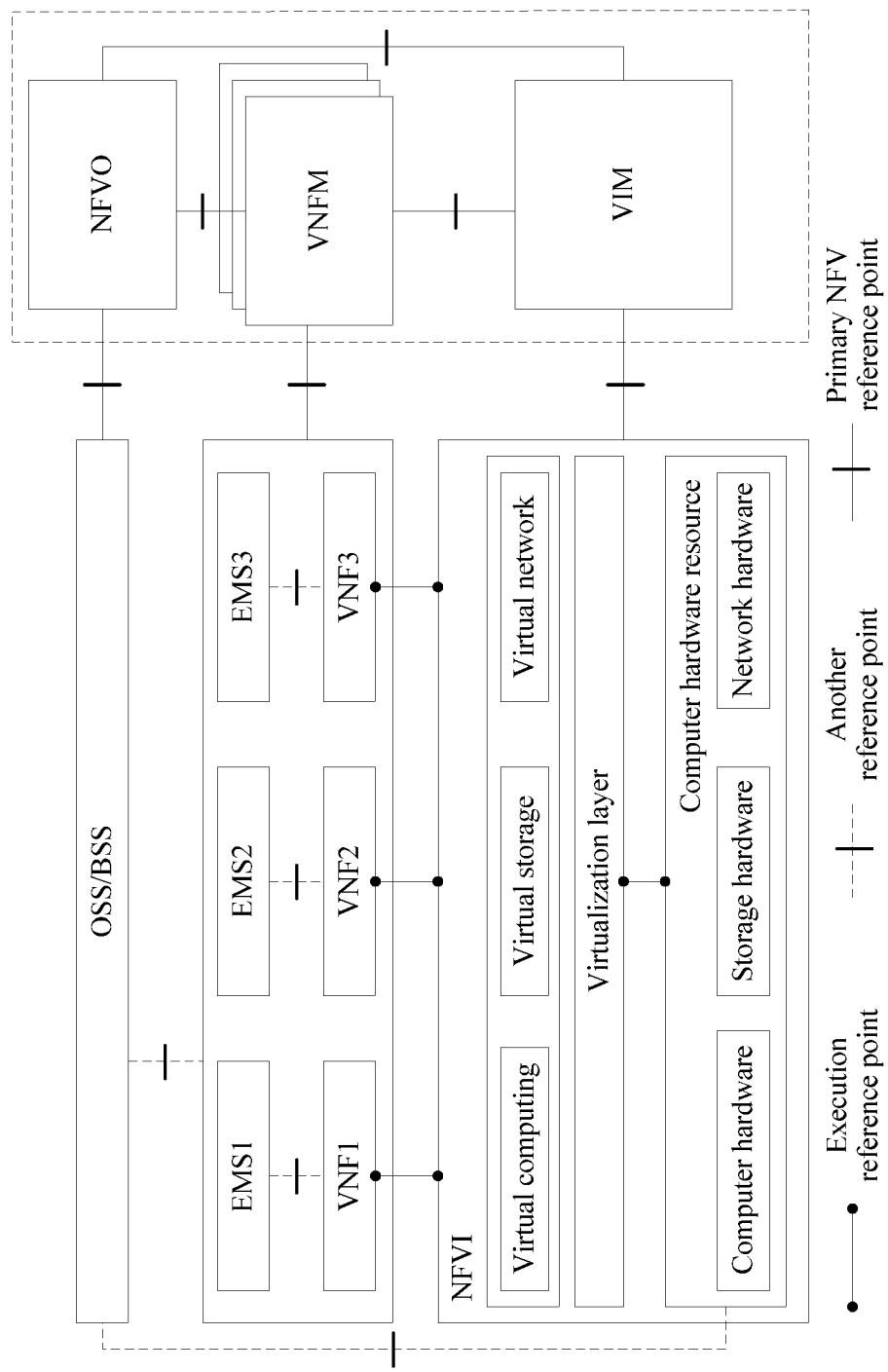
FIG. 1 is a schematic diagram of a new NFV standard architecture according to the prior art.

To cope with future competition and challenges and avoid being pipelined, an operator complies with a current development trend of a virtualization technology, a cloud computing technology, and the like, and proposes a new NFV standard architecture. As shown in FIG. 1, in comparison with a conventional NFV standard architecture (the conventional NFV standard architecture includes an operation support system (OSS)/a business support system BSS), an element management system (EMS), and a virtualized network function (VNF)), function objects such as a network function virtualization infrastructure (NFVI), a virtualized infrastructure manager (VIM, a virtualized network function manager VNFM), and a network function virtualization orchestrator (NFVO) are added to the new NFV standard architecture. The NFVI includes virtual computing, virtual storage, a virtual network, a virtualization layer, and a computer hardware resource. The computer hardware resource includes computer hardware, storage hardware, and network hardware.

In the new NFV standard architecture, a shared transmission path and resource are used for all services to which an NFV technology is applied, the NFV technology is applied to diversified services, and services of different service types or different user types differ in importance and a service requirement. Therefore, the operator has different requirements for availability levels of the services of different service types or different user types. In this case, how to meet requirements of the operator for availability levels of services of different types (which are classified according to different service types or different user types) and improve service availability experience has been a research focus in the art. According to a service availability management method provided in the embodiments of the present invention, a suitable resource can be allocated to a service of a corresponding type (the type may be a service type, or may be a user type), so as to meet a requirement of an operator for a service availability level of the service of the type as much as possible and improve service availability experience. In addition, according to the service availability management method provided in the embodiments of the present invention, different availability support may be effectively provided for services of different types, and flexible adaptive selection may be performed between a resource capability and an operator's requirement.

To facilitate understanding by a person skilled in the art, the embodiments of the present invention describe, by using the following embodiments, a specific implementation process of the service availability management method provided in an embodiment of the present invention.

Figure 2:
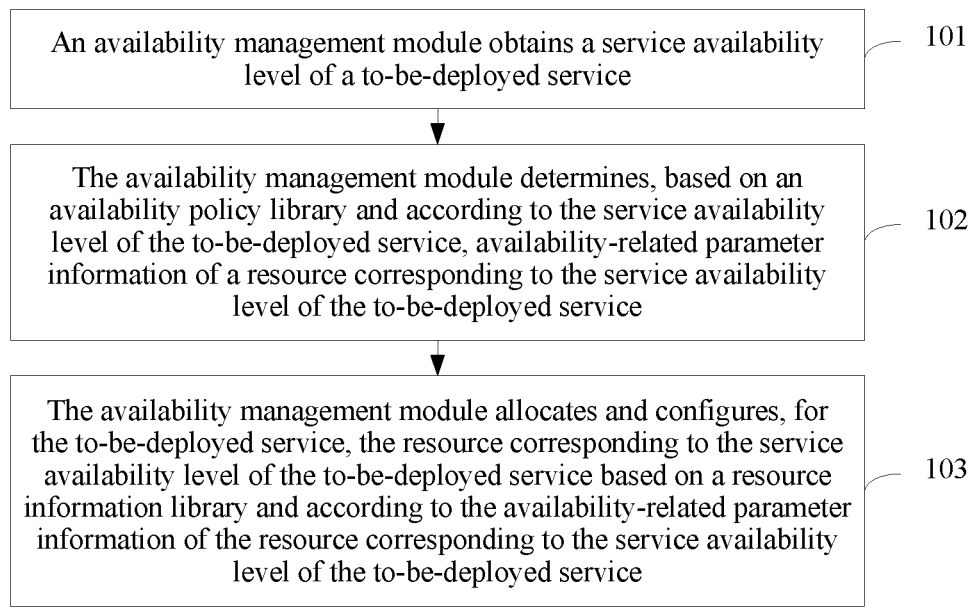
FIG. 2 is a flowchart of a service availability management method according to an embodiment of the present invention.

An embodiment of the present invention provides a service availability management method. As shown in FIG. 2, the method may include the following steps.

101. An availability management module obtains a service availability level of a to-be-deployed service.

In a possible implementation manner, the service availability level is determined according to a service type of the to-be-deployed service. In another possible implementation manner, the service availability level is determined according to a user type corresponding to the to-be-deployed service.

102. The availability management module determines, based on an availability policy library and according to the service availability level of the to-be-deployed service, availability-related parameter information of a resource corresponding to the service availability level of the to-be-deployed service.

The availability policy library prestores an availability policy. The availability policy includes at least one service availability level and availability-related parameter information of a resource corresponding to each service availability level.

Specifically, after obtaining the service availability level of the to-be-deployed service, the availability management module may determine, according to the obtained service availability level of the to-be-deployed service and based on the availability policy prestored in the availability policy library, the availability-related parameter information of the resource corresponding to the service availability level of the to-be-deployed service.

103. The availability management module allocates and configures, for the to-be-deployed service, the resource corresponding to the service availability level of the to-be-deployed service based on a resource information library and according to the availability-related parameter information of the resource corresponding to the service availability level of the to-be-deployed service.

The resource information library stores availability-related parameter information of a system-configured resource. The resource may include at least one of the following: an infrastructure resource, a non-high availability (HA) software resource, or an HA software resource. The infrastructure resource includes a hardware resource, a virtualization platform (Hypervisor), a virtual unit, and a virtual resource. The hardware resource includes a computing hardware resource, a storage hardware resource, and a network hardware resource. The virtual resource includes a virtual computing resource, a virtual storage resource, and a virtual network resource.

Specifically, after determining the availability-related parameter information of the resource corresponding to the service availability level of the to-be-deployed service, the availability management module may allocate and configure, for the to-be-deployed service, the resource corresponding to the service availability level of the to-be-deployed service based on the availability-related parameter information of the system-configured resource and according to the availability-related parameter information of the resource corresponding to the service availability level of the to-be-deployed service, where the availability-related parameter information of the system-configured resource is stored in the resource information library.

According to the service availability management method provided in an embodiment of the present invention, availability-related parameter information of a resource corresponding to a service availability level of a to-be-deployed service is determined from a preconfigured availability policy library according to the obtained service availability level of the to-be-deployed service, where the preconfigured availability policy library includes at least one service availability level and availability-related parameter information of a resource corresponding to each service availability level; and then the resource corresponding to the service availability level of the to-be-deployed service is allocated and configured for the to-be-deployed service based on a resource information library and according to the determined availability-related parameter information of the resource corresponding to the service availability level of the to-be-deployed service. The availability policy library may be used to finely allocate and configure, for the to-be-deployed service, at least one of the following corresponding resources: an infrastructure resource, a non-HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource. Therefore, a service availability level that a resource allocated to a service of a corresponding type can actually provide is as consistent as possible with a service availability level required by an operator, and service availability experience is ensured to the greatest extent.

Further, before step 103, the service availability management method described in this embodiment of the present invention may further include: obtaining, by the availability management module, specification-related parameter information of the resource. The specification-related parameter information of the resource may include at least one of the following: a resource quantity or resource performance.

In this case, step 103 may be specifically: allocating and configuring, by the availability management module for the to-be-deployed service, the resource corresponding to the service availability level of the to-be-deployed service based on the resource information library and according to the specification-related parameter information of the resource and the availability-related parameter information of the resource corresponding to the service availability level of the to-be-deployed service.

Further, reliability of an infrastructure resource corresponding to a high service availability level is higher than reliability of an infrastructure resource corresponding to a low service availability level.

Reliability of a non-HA software resource corresponding to a high service availability level is higher than reliability of a non-HA software resource corresponding to a low service availability level.

A quantity of function types of an HA software resource corresponding to a high service availability level is greater than a quantity of function types of an HA software resource corresponding to a low service availability level, and/or performance of a function of an HA software resource corresponding to a high service availability level is better than performance of the same function of an HA software resource corresponding to a low service availability level. The function types of the HA software resource may include a fault detection function, a fault analysis function, a prediction and prevention function, an enhanced fault recovery function, a flow control function, a disaster recovery failover function, a data backup function, a software hitless upgrade function, and a software gray upgrade function.

Further, availability-related parameter information of the infrastructure resource includes at least one of the following: a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource.

When infrastructure resources are being allocated and configured for a to-be-deployed service, it is assumed that a service availability level provided by N (N is a positive integer) infrastructure resources for the to-be-deployed service can meet an operator's requirement. In this case, when the infrastructure resources are being allocated and configured for the to-be-deployed service, in addition to the N infrastructure resources allocated and configured for the to-be-deployed service, another corresponding infrastructure resource may be further configured for the to-be-deployed service according to a redundancy quantity or ratio of the infrastructure resources (such as hardware resources, virtual resources, or virtual units). For example, the infrastructure resources are the hardware resources, a redundancy quantity of the hardware resources may be 1, 2, . . . , or M (M is a positive integer), and a redundancy ratio of the hardware resources may be N:1, N:2, . . . , or N:M (M is a positive integer).

For example, a hardware resource allocated and configured for a to-be-deployed service corresponding to a high service availability level may have a service life of one year to two years, while a hardware resource allocated and configured for a to-be-deployed service corresponding to a low service availability level may have a service life of five years.

A hardware resource allocated and configured for a to-be-deployed service corresponding to a high service availability level is a famous brand, while a hardware resource allocated and configured for a to-be-deployed service corresponding to a low service availability level is an ordinary brand.

A hardware resource (such as a computing hardware resource) allocated and configured for a to-be-deployed service corresponding to a high service availability level supports a memory error checking and correction (Error Correction Code, ECC) check, while a hardware resource (such as a computing hardware resource) allocated and configured for a to-be-deployed service corresponding to a low service availability level does not support the memory ECC check.

Availability-related parameter information of the non-HA software resource may include at least one of the following: a manufacturer of the non-HA software resource, a version of the non-HA software resource, a redundancy quantity or ratio of the non-HA software resource, or anti-affinity of the non-HA software resource. The non-HA software resource includes a service chain, a VNF, and a virtualized network function component (VNFC for short).

For example, when a non-HA software resource of a later version and a non-HA software resource of an earlier version coexist, a stable non-HA software resource, that is, the non-HA software resource of the earlier version is allocated and configured for a to-be-deployed service corresponding to a high service availability level, while a non-HA software resource without adequate verification, that is, the non-HA software resource of the later version is allocated and configured for a to-be-deployed service corresponding to a low service availability level.

Availability-related parameter information of the HA software resource may include at least one of the following: a function type of the HA software resource or function parameter configuration of the HA software resource.

Further, the enhanced reliability feature of the hardware resource includes at least one of the following: a central processing unit (CPU for short) hot swap, a CPU enhanced fault detection and recovery function, a memory ECC check, a storage disk array (RAID for short), power redundancy, or fan redundancy.

Further, the availability policy library may further store a service candidate policy or degradation policy. In this case, the service availability management method described in this embodiment of the present invention may further include: allocating and configuring, by the availability management module, a corresponding resource for the to-be-deployed service based on the resource information library and according to the service candidate policy or degradation policy when the availability-related parameter information that is of the system-configured resource and stored in the resource information library does not have parameter information matching the availability-related parameter information that is of the resource corresponding to the service availability level of the to-be-deployed service and determined based on the availability policy library.

Figure 3:
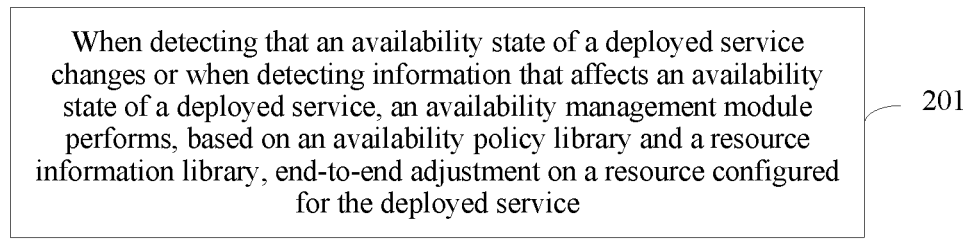
FIG. 3 is a flowchart of a service availability management method according to another embodiment of the present invention.

Another embodiment of the present invention provides a service availability management method. As shown in FIG. 3, the method may include the following step.

201. When detecting that an availability state of a deployed service changes or when detecting information that affects an availability state of a deployed service, an availability management module performs, based on an availability policy library and a resource information library, end-to-end adjustment on a resource configured for the deployed service.

The availability policy library stores an availability policy. The availability policy includes at least one service availability level and availability-related parameter information of a resource corresponding to each service availability level. In a possible implementation manner, the service availability level is determined according to a service type of a service. In another possible implementation manner, the service availability level is determined according to a user type corresponding to a service.

When detecting that the availability state of the deployed service changes or when detecting the information that affects the availability state of the deployed service, the availability management module preferentially performs, based on the availability policy library and the resource information library, end-to-end adjustment on a resource of a service whose service availability level is high.

The resource information library stores availability-related parameter information of a system-configured resource. The resource includes at least one of the following: an infrastructure resource, a non-HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource.

According to the service availability management method provided in an embodiment of the present invention, when it is detected that an availability state of a deployed service changes or when information that affects an availability state of a deployed service is detected, end-to-end adjustment may be performed, based on an availability policy library and a resource information library, on a resource configured for the deployed service, so as to ensure service availability experience of a service corresponding to a high service availability level.

Further, reliability of an infrastructure resource corresponding to a high service availability level is higher than reliability of an infrastructure resource corresponding to a low service availability level.

Reliability of a non-HA software resource corresponding to a high service availability level is higher than reliability of a non-HA software resource corresponding to a low service availability level.

A quantity of function types of an HA software resource corresponding to a high service availability level is greater than a quantity of function types of an HA software resource corresponding to a low service availability level, and/or performance of a function of an HA software resource corresponding to a high service availability level is better than performance of the same function of an HA software resource corresponding to a low service availability level. The function types of the HA software resource may include a fault detection function, a fault analysis function, a prediction and prevention function, an enhanced fault recovery function, a flow control function, a disaster recovery failover function, a data backup function, a software hitless upgrade function, and a software gray upgrade function.

Further, availability-related parameter information of the infrastructure resource includes at least one of the following: a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource.

Availability-related parameter information of the non-HA software resource may include at least one of the following: a manufacturer of the non-HA software resource, a version of the non-HA software resource, a redundancy quantity or ratio of the non-HA software resource, or anti-affinity of the non-HA software resource. The non-HA software resource includes a service chain, a VNF, and a VNFC.

Availability-related parameter information of the HA software resource may include at least one of the following: a function type of the HA software resource or function parameter configuration of the HA software resource.

Further, the enhanced reliability feature of the hardware resource includes at least one of the following: a CPU hot swap, a CPU enhanced fault detection and recovery function, a memory ECC check, a storage RAID, power redundancy, or fan redundancy.

Further, that an availability state of a deployed service changes may include at least one of the following: a key performance indicator (KPI for short) of the deployed service changes. That a KPI of the deployed service changes may include at least one of the following: a service flow of the deployed service changes, a service user quantity of the deployed service changes, a service ratio of the deployed service changes, a service success rate of the deployed service changes, a service access delay of the deployed service changes, or a service processing time of the deployed service changes.

The information that affects the availability state of the deployed service may include: a system resource changes. That a system resource changes includes at least one of the following: the non-HA software resource is upgraded, the HA software resource is upgraded, a new infrastructure resource is added, the infrastructure resource encounters a fault, a new non-HA software resource is added, a new HA software resource is added, parameter configuration of the HA software resource is adjusted, a network packet loss rate changes, or a network delay changes.

Further, when that the system resource changes includes that a new infrastructure resource is added, step 201 may specifically include: migrating, by the availability management module, the deployed service to the added new infrastructure resource when a service availability level of the deployed service is higher than a service availability level of another deployed service in a system, and reliability of the added new infrastructure resource is higher than reliability of an infrastructure resource configured for the deployed service.

When that the system resource changes includes that the infrastructure resource encounters a fault, step 201 may specifically include: when it is determined that the system resource is inadequate because the infrastructure resource encounters a fault, allocating and configuring, by the availability management module for the deployed service, an infrastructure resource configured for a service whose service availability level is lower than a service availability level of the deployed service.

When that the system resource changes includes that the infrastructure resource encounters a fault, step 201 may specifically include: when a service availability level of the deployed service is higher than a service availability level of another deployed service in a system, preferentially migrating, by the availability management module, the deployed service whose availability level is high to another infrastructure resource.

When that the system resource changes includes that a new HA software resource is added, step 201 may specifically include: when a service availability level of the deployed service is higher than a service availability level of another deployed service in a system, preferentially configuring, by the availability management module, the added new HA software resource for the deployed service whose availability level is high.

Figure 4:
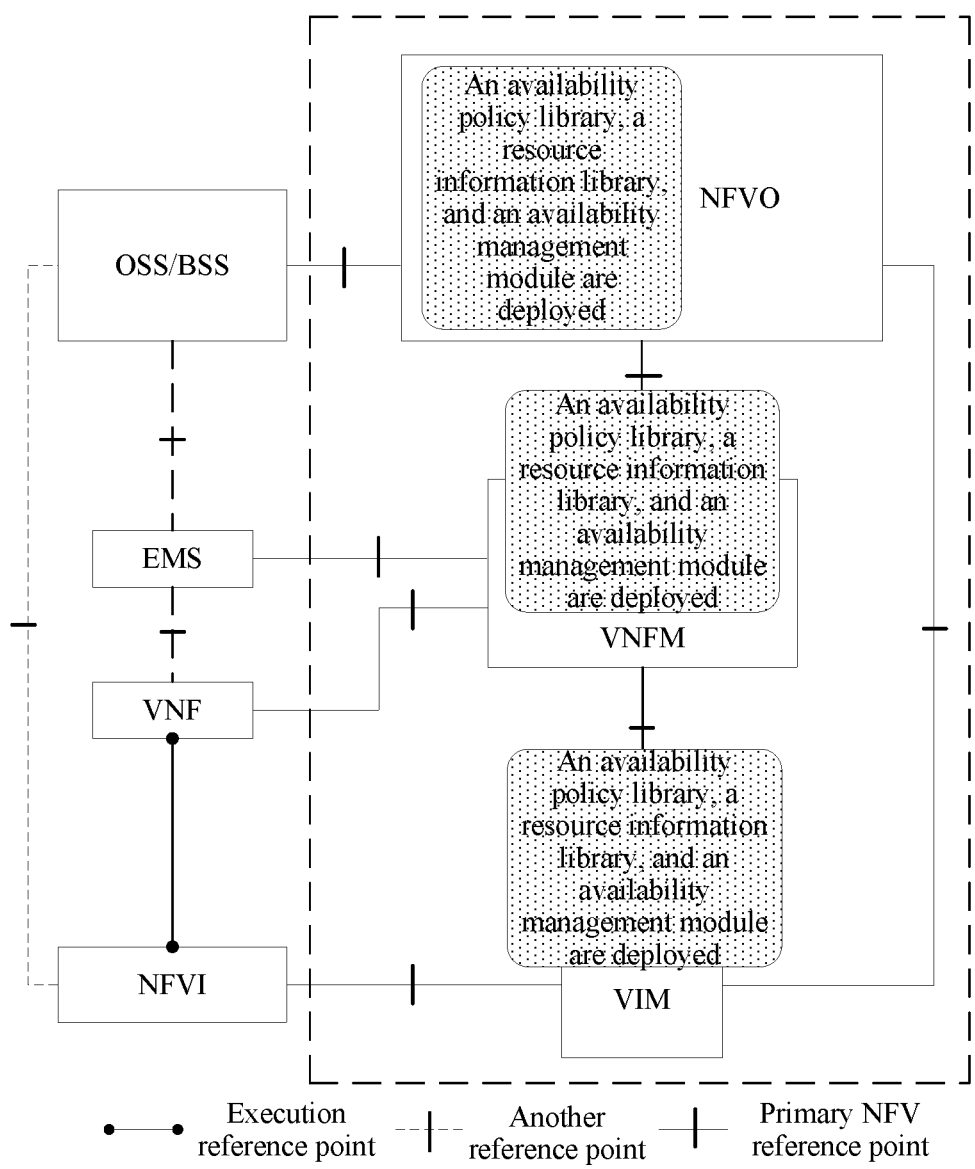
FIG. 4 is a schematic diagram of an NFV architecture according to another embodiment of the present invention.

Another embodiment of the present invention provides another service availability management method, which is applied to an NFV architecture shown in FIG. 4. The NFV architecture includes function objects such as an OSS/a BSS, an EMS, a VNF, an NFVI, an NFVO, a VNFM, and a VIM. As shown in FIG. 4, an availability management module, an availability policy library, and a resource information library are deployed in the NFVO, an availability management module, an availability policy library, and a resource information library are deployed in the VNFM, and an availability management module, an availability policy library, and a resource information library are deployed in the VIM.

Figures 5, 6:
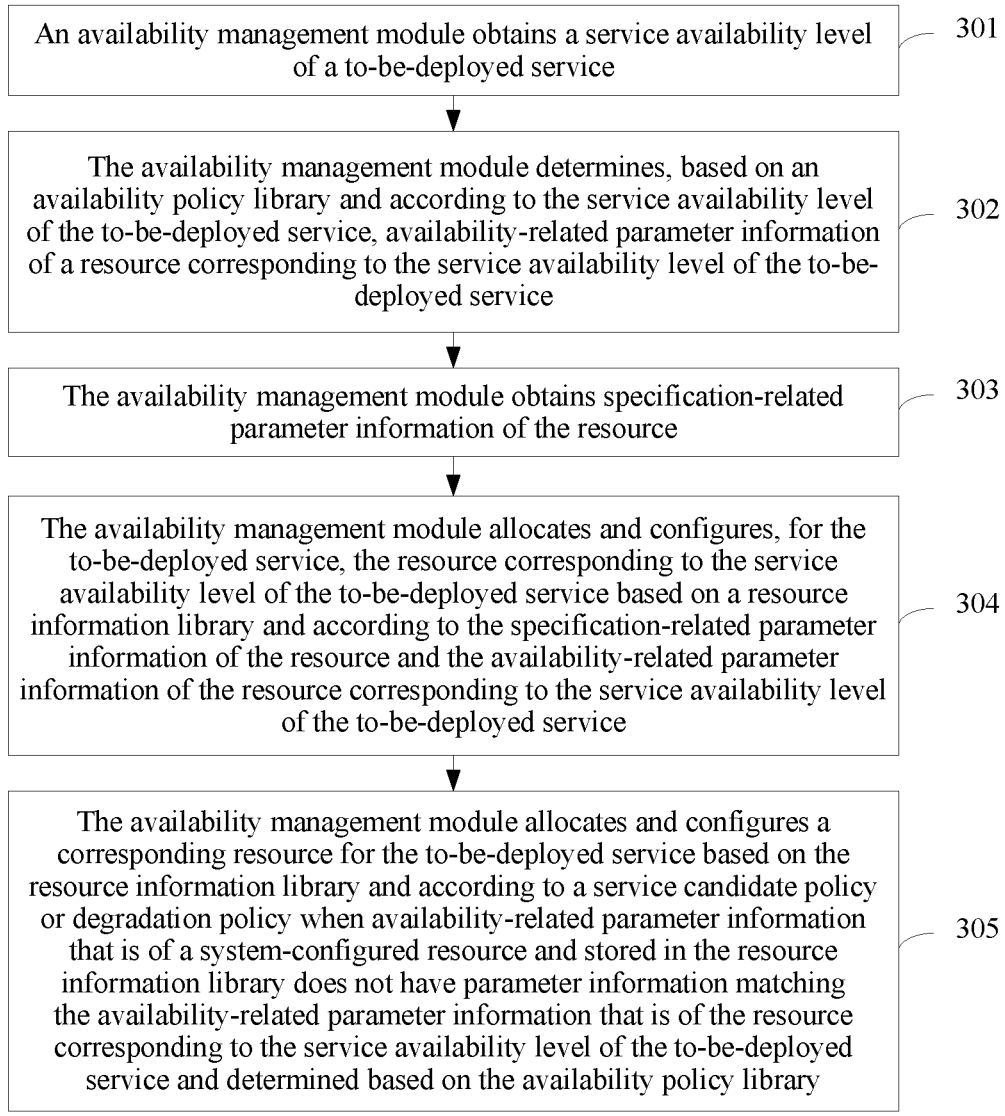
FIG. 5 is a flowchart of a service availability management method according to another embodiment of the present invention.
FIG. 6 is a flowchart of a service availability management method according to another embodiment of the present invention.

In this case, as shown in FIG. 5, in a service deployment phase, the service availability management method may include the following steps.

301. An availability management module obtains a service availability level of a to-be-deployed service.

The availability management module deployed in the NFVO may obtain, from the OSS/BSS or another configuration tool, the service availability level of the to-be-deployed service.

The availability management module deployed in the VNFM may obtain, from the availability management module deployed in the NFVO, the service availability level of the to-be-deployed service.

The availability management module deployed in the VIM may directly obtain, from the availability management module deployed in the NFVO, the service availability level of the to-be-deployed service, or may obtain, from the availability management module deployed in the NFVO, the service availability level of the to-be-deployed service by using the availability management module deployed in the VNFM.

302. The availability management module determines, based on an availability policy library and according to the service availability level of the to-be-deployed service, availability-related parameter information of a resource corresponding to the service availability level of the to-be-deployed service.

The availability policy library may be configured to store an availability policy. The availability policy includes at least one service availability level and availability-related parameter information of a resource corresponding to each service availability level.

Specifically, after the availability management module deployed in the NFVO obtains the service availability level of the to-be-deployed service, the availability management module deployed in the NFVO may determine, based on the availability policy library deployed in the NFVO, the availability-related parameter information of the resource corresponding to the service availability level of the to-be-deployed service.

After the availability management module deployed in the VNFM obtains the service availability level of the to-be-deployed service, the availability management module deployed in the VNFM may determine, based on the availability policy library deployed in the VNFM, the availability-related parameter information of the resource corresponding to the service availability level of the to-be-deployed service.

After the availability management module deployed in the VIM obtains the service availability level of the to-be-deployed service, the availability management module deployed in the VIM may determine, based on the availability policy library deployed in the VIM, the availability-related parameter information of the resource corresponding to the service availability level of the to-be-deployed service.

Further, the availability policy library may be further configured to store a service candidate policy or degradation policy.

303. The availability management module obtains specification-related parameter information of the resource.

For example, the availability management module deployed in the NFVO may obtain, from the VIM or the VNFM, the specification-related parameter information of the resource.

The specification-related parameter information of the resource may include at least one of the following: a resource quantity or resource performance.

304. The availability management module allocates and configures, for the to-be-deployed service, the resource corresponding to the service availability level of the to-be-deployed service based on a resource information library and according to the specification-related parameter information of the resource and the availability-related parameter information of the resource corresponding to the service availability level of the to-be-deployed service.

The resource information library stores availability-related parameter information of a system-configured resource. The resource may include at least one of the following: an infrastructure resource, a non-HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource. The non-HA software resource includes a service chain, a VNF, and a VNFC.

Specifically, after the availability management module deployed in the NFVO determines the availability-related parameter information of the resource corresponding to the service availability level of the to-be-deployed service, and obtains the specification-related parameter information of the resource, the availability management module deployed in the NFVO may allocate and configure, for the to-be-deployed service, the resource corresponding to the service availability level of the to-be-deployed service based on the resource information library and according to the specification-related parameter information of the resource and the availability-related parameter information of the resource corresponding to the service availability level of the to-be-deployed service, where the resource information library is deployed in the NFVO.

For example, the availability management module deployed in the NFVO may allocate and configure, for the to-be-deployed service, some non-HA software resources corresponding to the service availability level of the to-be-deployed service.

After the availability management module deployed in the VNFM determines the availability-related parameter information of the resource corresponding to the service availability level of the to-be-deployed service, and obtains the specification-related parameter information of the resource, the availability management module deployed in the VNFM may allocate and configure, for the to-be-deployed service, the resource corresponding to the service availability level of the to-be-deployed service based on the resource information library and according to the specification-related parameter information of the resource and the availability-related parameter information of the resource corresponding to the service availability level of the to-be-deployed service, where the resource information library is deployed in the VNFM.

For example, the availability management module deployed in the VNFM may allocate and configure, for the to-be-deployed service, some HA software resources and some non-HA software resources that are corresponding to the service availability level of the to-be-deployed service.

After the availability management module deployed in the VIM determines the availability-related parameter information of the resource corresponding to the service availability level of the to-be-deployed service, and obtains the specification-related parameter information of the resource, the availability management module deployed in the VIM may allocate and configure, for the to-be-deployed service, the resource corresponding to the service availability level of the to-be-deployed service based on the resource information library and according to the specification-related parameter information of the resource and the availability-related parameter information of the resource corresponding to the service availability level of the to-be-deployed service, where the resource information library is deployed in the VIM.

For example, the availability management module deployed in the VNFM may allocate and configure, for the to-be-deployed service, some HA software resources and infrastructure resources that are corresponding to the service availability level of the to-be-deployed service.

305. The availability management module allocates and configures a corresponding resource for the to-be-deployed service based on the resource information library and according to a service candidate policy or degradation policy when availability-related parameter information that is of a system-configured resource and stored in the resource information library does not have parameter information matching the availability-related parameter information that is of the resource corresponding to the service availability level of the to-be-deployed service and determined based on the availability policy library.

Specifically, after the availability management module deployed in the NFVO determines the availability-related parameter information of the resource corresponding to the service availability level of the to-be-deployed service, and obtains the specification-related parameter information of the resource, if the availability-related parameter information that is of the system-configured resource and stored in the resource information library deployed in the NFVO does not have the parameter information matching the determined availability-related parameter information of the resource corresponding to the service availability level of the to-be-deployed service, the availability management module deployed in the NFVO may allocate and configure the corresponding resource for the to-be-deployed service based on the resource information library and according to the specification-related parameter information of the resource, the service candidate policy or degradation policy, and the availability-related parameter information of the resource corresponding to the service availability level of the to-be-deployed service, where the resource information library is deployed in the NFVO.

After the availability management module deployed in the VNFM determines the availability-related parameter information of the resource corresponding to the service availability level of the to-be-deployed service, and obtains the specification-related parameter information of the resource, if the availability-related parameter information that is of the system-configured resource and stored in the resource information library deployed in the VNFM does not have the parameter information matching the determined availability-related parameter information of the resource corresponding to the service availability level of the to-be-deployed service, the availability management module deployed in the VNFM may allocate and configure the corresponding resource for the to-be-deployed service based on the resource information library and according to the specification-related parameter information of the resource, the service candidate policy or degradation policy, and the availability-related parameter information of the resource corresponding to the service availability level of the to-be-deployed service, where the resource information library is deployed in the VNFM.

After the availability management module deployed in the VIM determines the availability-related parameter information of the resource corresponding to the service availability level of the to-be-deployed service, and obtains the specification-related parameter information of the resource, if the availability-related parameter information that is of the system-configured resource and stored in the resource information library deployed in the VIM does not have the parameter information matching the determined availability-related parameter information of the resource corresponding to the service availability level of the to-be-deployed service, the availability management module deployed in the VIM may allocate and configure the corresponding resource for the to-be-deployed service based on the resource information library and according to the specification-related parameter information of the resource, the service candidate policy or degradation policy, and the availability-related parameter information of the resource corresponding to the service availability level of the to-be-deployed service, where the resource information library is deployed in the VIM.

In this case, as shown in FIG. 6, in a service running phase, the service availability management method may include the following step.

401. When detecting that an availability state of a deployed service changes or when detecting information that affects an availability state of a deployed service, an availability management module performs, based on an availability policy library and a resource information library, end-to-end adjustment on a resource configured for the deployed service.

The availability management module deployed in the NFVO may obtain, from the OSS/BSS or the EMS, the availability state of the deployed service by using the availability management module deployed in the VNFM. The availability management module deployed in the NFVO may obtain, from another function module of the availability management module deployed in the NFVO, the information that affects the availability state of the deployed service.

The availability management module deployed in the VNFM may obtain, from the EMS, the availability state of the deployed service. The availability management module deployed in the VNFM may obtain, from the EMS or the VNF, the information that affects the availability state of the deployed service.

The availability management module deployed in the VIM may obtain, from the NFVI, the information that affects the availability state of the deployed service.

It should be noted that for specific descriptions about parameters in step 301 to step 305 and step 401 in this embodiment of the present invention, refer to specific descriptions about the corresponding parameters in step 101 to step 103 and step 201 in the another embodiment of the present invention. Details are not described herein again in this embodiment of the present invention.

According to the service availability management method provided in embodiments of the present invention, availability-related parameter information of a resource corresponding to a service availability level of a to-be-deployed service is determined from a preconfigured availability policy library according to the obtained service availability level of the to-be-deployed service, where the preconfigured availability policy library includes at least one service availability level and availability-related parameter information of a resource corresponding to each service availability level; and then the resource corresponding to the service availability level of the to-be-deployed service is allocated and configured for the to-be-deployed service based on a resource information library and according to the determined availability-related parameter information of the resource corresponding to the service availability level of the to-be-deployed service. The availability policy library may be used to allocate and configure, for the to-be-deployed service, at least one of the following corresponding resources: an infrastructure resource, a non-HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource. Therefore, a service availability level that a resource allocated to a service of a corresponding type can actually provide is as consistent as possible with a service availability level required by an operator, and service availability experience is ensured to the greatest extent.

In addition, when it is detected that an availability state of a deployed service changes or when information that affects an availability state of a deployed service is detected, end-to-end adjustment may be performed, based on the availability policy library and the resource information library, on a resource configured for the deployed service, so as to ensure service availability experience of a service corresponding to a high service availability level.

Figure 7:
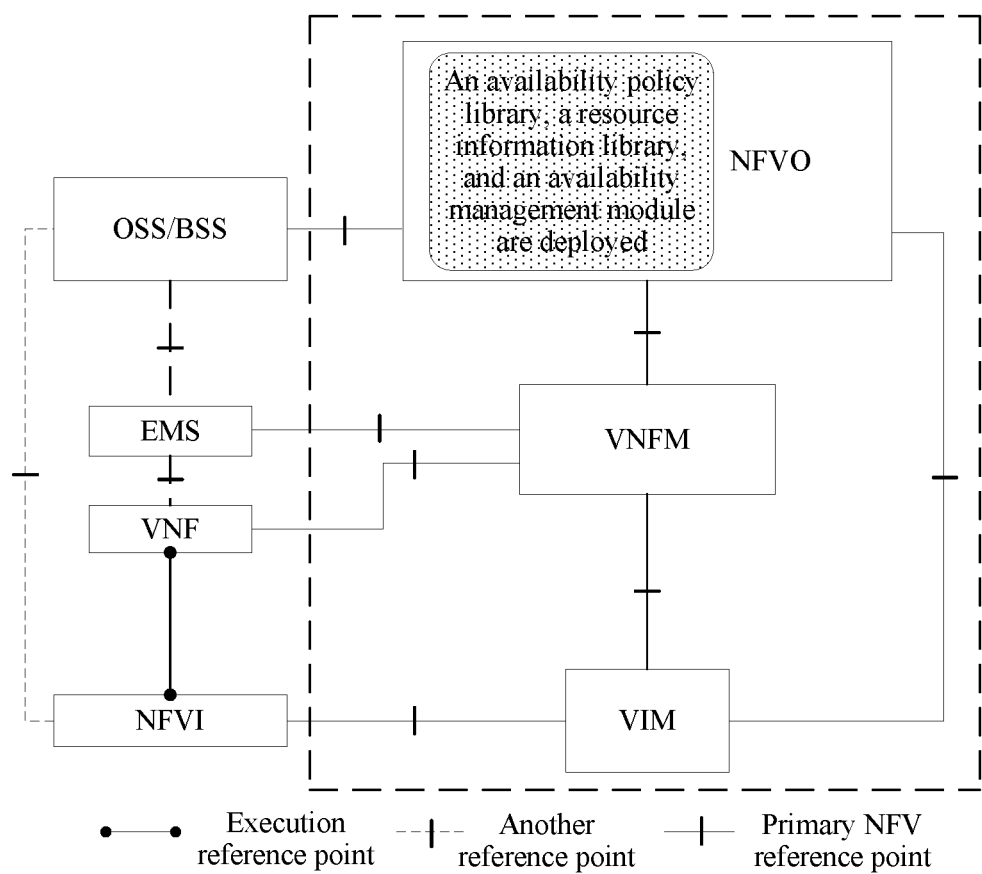
FIG. 7 is a schematic diagram of an NFV architecture according to another embodiment of the present invention.

Another embodiment of the present invention provides another service availability management method, which is applied to an NFV architecture shown in FIG. 7. The NFV architecture includes function objects such as an OSS/a BSS, an EMS, a VNF, an NFVI, an NFVO, a VNFM, and a VIM. As shown in FIG. 7, an availability management module, an availability policy library, and a resource information library are deployed in the NFVO.

Figures 8, 9:
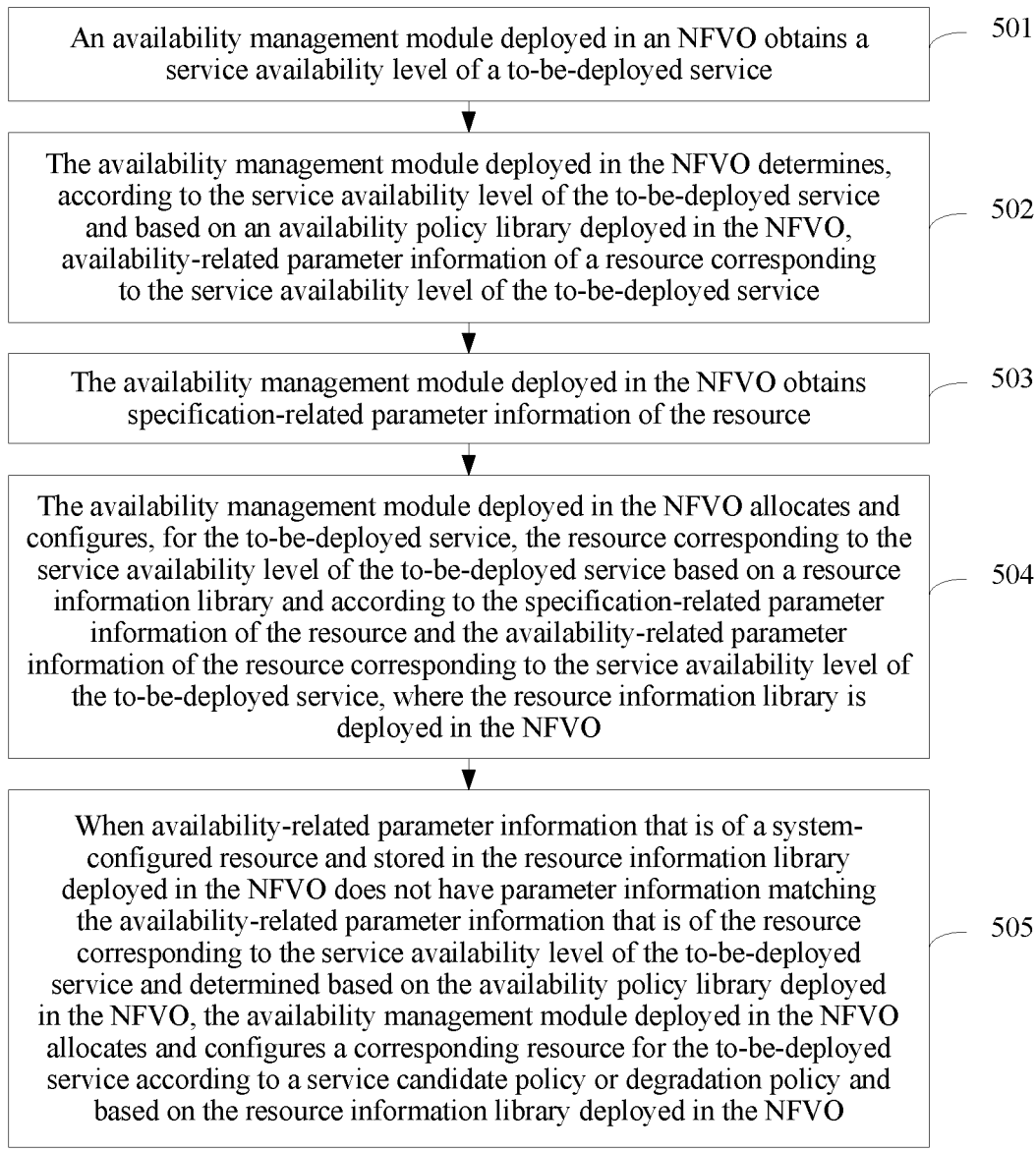
FIG. 8 is a flowchart of a service availability management method according to another embodiment of the present invention.
FIG. 9 is a flowchart of a service availability management method according to another embodiment of the present invention.

In this case, as shown in FIG. 8, in a service deployment phase, the service availability management method may include the following steps.

501. An availability management module deployed in an NFVO obtains a service availability level of a to-be-deployed service.

The availability management module deployed in the NFVO may obtain, from the OSS/BSS or another configuration tool, the service availability level of the to-be-deployed service.

502. The availability management module deployed in the NFVO determines, according to the service availability level of the to-be-deployed service and based on an availability policy library deployed in the NFVO, availability-related parameter information of a resource corresponding to the service availability level of the to-be-deployed service.

Specifically, after the availability management module deployed in the NFVO obtains the service availability level of the to-be-deployed service, the availability management module deployed in the NFVO may determine, based on the availability policy library deployed in the NFVO, the availability-related parameter information of the resource corresponding to the service availability level of the to-be-deployed service.

Further, the availability policy library may be further configured to store a service candidate policy or degradation policy.

503. The availability management module deployed in the NFVO obtains specification-related parameter information of the resource.

For example, the availability management module deployed in the NFVO may obtain, from the VIM or the VNFM, the specification-related parameter information of the resource.

504. The availability management module deployed in the NFVO allocates and configures, for the to-be-deployed service, the resource corresponding to the service availability level of the to-be-deployed service based on a resource information library and according to the specification-related parameter information of the resource and the availability-related parameter information of the resource corresponding to the service availability level of the to-be-deployed service, where the resource information library is deployed in the NFVO.

Specifically, after the availability management module deployed in the NFVO determines the availability-related parameter information of the resource corresponding to the service availability level of the to-be-deployed service, and obtains the specification-related parameter information of the resource, the availability management module deployed in the NFVO may allocate and configure, for the to-be-deployed service by using an interface of the NFVO or an interface of the VNFM or an interface of the VIM, the resource corresponding to the service availability level of the to-be-deployed service based on the resource information library deployed in the NFVO, and according to the specification-related parameter information of the resource and the availability-related parameter information of the resource corresponding to the service availability level of the to-be-deployed service.

505. When availability-related parameter information that is of a system-configured resource and stored in the resource information library deployed in the NFVO does not have parameter information matching the availability-related parameter information that is of the resource corresponding to the service availability level of the to-be-deployed service and determined based on the availability policy library deployed in the NFVO, the availability management module deployed in the NFVO allocates and configures a corresponding resource for the to-be-deployed service according to a service candidate policy or degradation policy and based on the resource information library deployed in the NFVO.

Specifically, after the availability management module deployed in the NFVO determines the availability-related parameter information of the resource corresponding to the service availability level of the to-be-deployed service, and obtains the specification-related parameter information of the resource, if the availability-related parameter information that is of the system-configured resource and stored in the resource information library deployed in the NFVO does not have the parameter information matching the determined availability-related parameter information of the resource corresponding to the service availability level of the to-be-deployed service, the availability management module deployed in the NFVO may allocate and configure the corresponding resource for the to-be-deployed service by using the interface of the NFVO or the interface of the VNFM or the interface of the VIM, based on the resource information library deployed in the NFVO, and according to the specification-related parameter information of the resource, the service candidate policy or degradation policy, and the availability-related parameter information of the resource corresponding to the service availability level of the to-be-deployed service.

In this case, as shown in FIG. 9, in a service running phase, the service availability management method may include the following step.

601. When detecting that an availability state of a deployed service changes or when detecting information that affects an availability state of a deployed service, an availability management module deployed in an NFVO performs, based on an availability policy library and a resource information library that are deployed in the NFVO, end-to-end adjustment on a resource configured for the deployed service.

The availability management module deployed in the NFVO may obtain, from the OSS/BSS or the EMS, the availability state of the deployed service by using the VNFM.

The availability management module deployed in the NFVO may obtain, from the VNFM, the information that affects the availability state of the deployed service, or obtain, from the NFVI by using the VIM, the information that affects the availability state of the deployed service.

Specifically, after obtaining the availability state of the deployed service, the availability management module deployed in the NFVO may detect whether the availability state of the deployed service changes. If detecting that the availability state of the deployed service changes, the availability management module deployed in the NFVO may perform, based on the availability policy library and the resource information library that are deployed in the NFVO, end-to-end adjustment on the resource configured for the deployed service.

Alternatively, after the availability management module deployed in the NFVO detects the information that affects the availability state of the deployed service, the availability management module deployed in the NFVO may perform, based on the availability policy library and the resource information library that are deployed in the NFVO, end-to-end adjustment on the resource configured for the deployed service.

It should be noted that for specific descriptions about parameters in step 501 to step 505 and step 610 in this embodiment of the present invention, refer to specific descriptions about the corresponding parameters in step 101 to step 103 and step 201 in the another embodiment of the present invention. Details are not described herein again in this embodiment of the present invention.

According to the service availability management method provided in embodiments of the present invention, availability-related parameter information of a resource corresponding to a service availability level of a to-be-deployed service is determined from a preconfigured availability policy library according to the obtained service availability level of the to-be-deployed service, where the preconfigured availability policy library includes at least one service availability level and availability-related parameter information of a resource corresponding to each service availability level; and then the resource corresponding to the service availability level of the to-be-deployed service is allocated and configured for the to-be-deployed service based on a resource information library and according to the determined availability-related parameter information of the resource corresponding to the service availability level of the to-be-deployed service. The availability policy library may be used to allocate and configure, for the to-be-deployed service, at least one of the following corresponding resources: an infrastructure resource, a non-HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource. Therefore, a service availability level that a resource allocated to a service of a corresponding type can actually provide is as consistent as possible with a service availability level required by an operator, and service availability experience is ensured to the greatest extent.

In addition, when it is detected that an availability state of a deployed service changes or when information that affects an availability state of a deployed service is detected, end-to-end adjustment may be performed, based on the availability policy library and the resource information library, on a resource configured for the deployed service, so as to ensure service availability experience of a service corresponding to a high service availability level.

Figure 10:
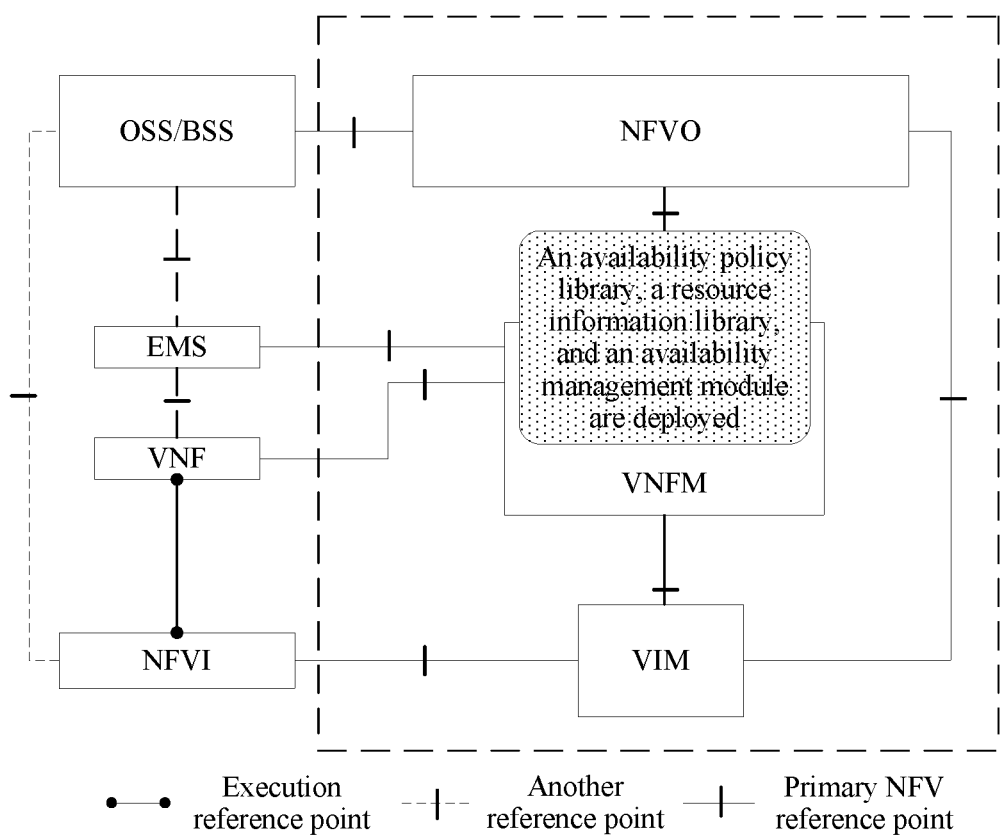
FIG. 10 is a schematic diagram of an NFV architecture according to another embodiment of the present invention.

Another embodiment of the present invention provides another service availability management method, which is applied to an NFV architecture shown in FIG. 10. The NFV architecture includes function objects such as an OSS/a BSS, an EMS, a VNF, an NFVI, an NFVO, a VNFM, and a VIM. As shown in FIG. 10, an availability management module, an availability policy library, and a resource information library are deployed in the VNFM.

Figures 11, 12:
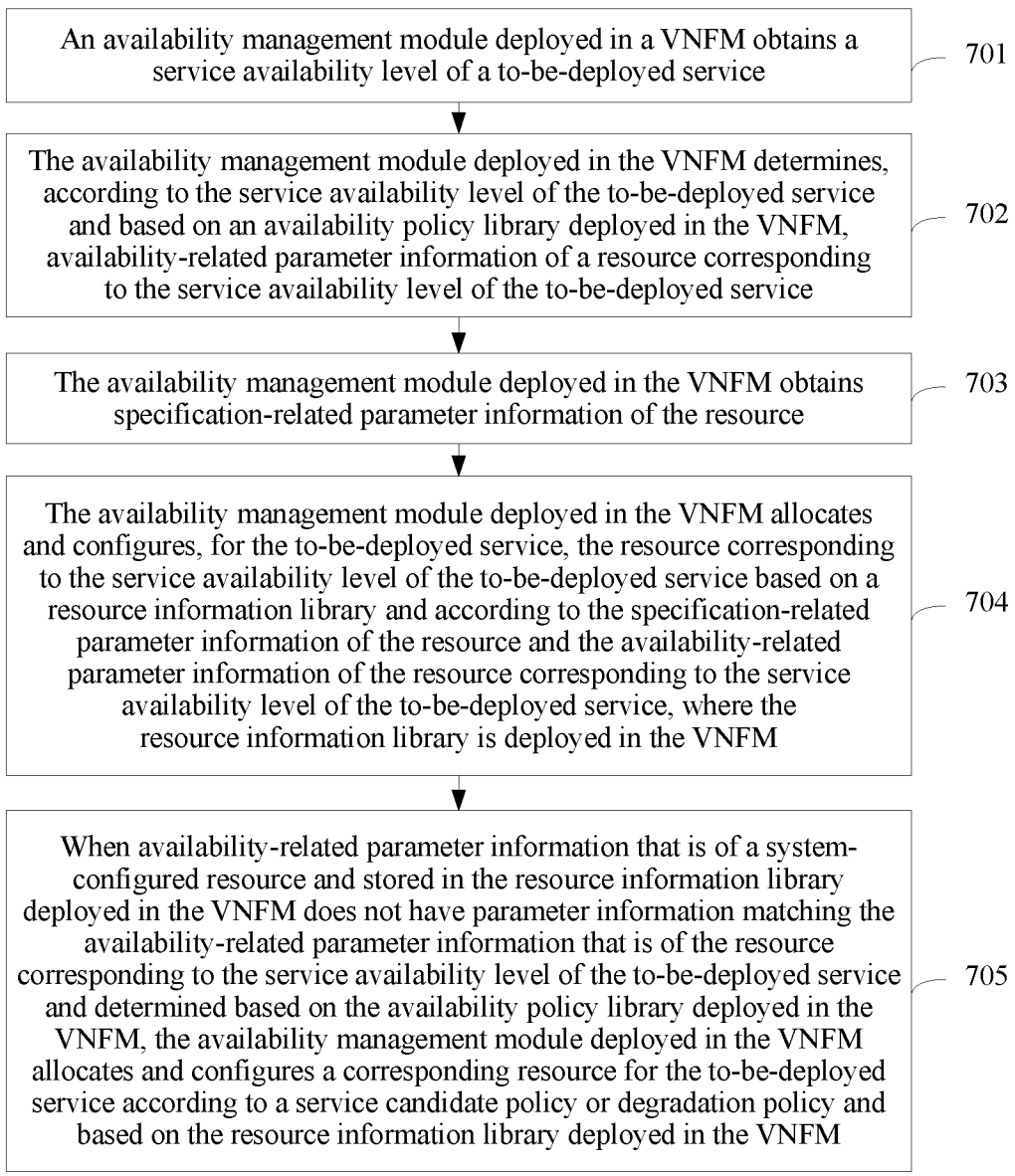
FIG. 11 is a flowchart of a service availability management method according to another embodiment of the present invention.
FIG. 12 is a flowchart of a service availability management method according to another embodiment of the present invention.

In this case, as shown in FIG. 11, in a service deployment phase, the service availability management method may include the following steps.

701. An availability management module deployed in a VNFM obtains a service availability level of a to-be-deployed service.

The availability management module deployed in the VNFM may obtain, from the NFVO, the service availability level of the to-be-deployed service.

702. The availability management module deployed in the VNFM determines, according to the service availability level of the to-be-deployed service and based on an availability policy library deployed in the VNFM, availability-related parameter information of a resource corresponding to the service availability level of the to-be-deployed service.

Specifically, after the availability management module deployed in the VNFM obtains the service availability level of the to-be-deployed service, the availability management module deployed in the VNFM may determine, based on the availability policy library deployed in the VNFM, the availability-related parameter information of the resource corresponding to the service availability level of the to-be-deployed service.

Further, the availability policy library may be further configured to store a service candidate policy or degradation policy.

703. The availability management module deployed in the VNFM obtains specification-related parameter information of the resource.

For example, the availability management module deployed in the VNFM may obtain, from the VIM, the specification-related parameter information of the resource, or may obtain, from another function module of the availability management module deployed in the VNFM, the specification-related parameter information of the resource.

704. The availability management module deployed in the VNFM allocates and configures, for the to-be-deployed service, the resource corresponding to the service availability level of the to-be-deployed service based on a resource information library and according to the specification-related parameter information of the resource and the availability-related parameter information of the resource corresponding to the service availability level of the to-be-deployed service, where the resource information library is deployed in the VNFM.

Specifically, after the availability management module deployed in the VNFM determines the availability-related parameter information of the resource corresponding to the service availability level of the to-be-deployed service, and obtains the specification-related parameter information of the resource, the availability management module deployed in the VNFM may allocate and configure, for the to-be-deployed service by using an interface of the VNFM or an interface of the VIM, the resource corresponding to the service availability level of the to-be-deployed service based on the resource information library deployed in the VNFM, and according to the specification-related parameter information of the resource and the availability-related parameter information of the resource corresponding to the service availability level of the to-be-deployed service.

705. When availability-related parameter information that is of a system-configured resource and stored in the resource information library deployed in the VNFM does not have parameter information matching the availability-related parameter information that is of the resource corresponding to the service availability level of the to-be-deployed service and determined based on the availability policy library deployed in the VNFM, the availability management module deployed in the VNFM allocates and configures a corresponding resource for the to-be-deployed service according to a service candidate policy or degradation policy and based on the resource information library deployed in the VNFM.

Specifically, after the availability management module deployed in the VNFM determines the availability-related parameter information of the resource corresponding to the service availability level of the to-be-deployed service, and obtains the specification-related parameter information of the resource, if the availability-related parameter information that is of the system-configured resource and stored in the resource information library deployed in the VNFM does not have the parameter information matching the determined availability-related parameter information of the resource corresponding to the service availability level of the to-be-deployed service, the availability management module deployed in the VNFM may allocate and configure the corresponding resource for the to-be-deployed service by using the interface of the VNFM or the interface of the VIM, based on the resource information library deployed in the VNFM, and according to the specification-related parameter information of the resource, the service candidate policy or degradation policy, and the availability-related parameter information of the resource corresponding to the service availability level of the to-be-deployed service.

In this case, as shown in FIG. 12, in a service running phase, the service availability management method may include the following step.

801. When detecting that an availability state of a deployed service changes or when detecting information that affects an availability state of a deployed service, an availability management module deployed in an NFVO performs, based on an availability policy library and a resource information library that are deployed in the NFVO, end-to-end adjustment on a resource configured for the deployed service.

The availability management module deployed in the VNFM may obtain, from the EMS, the availability state of the deployed service.

The availability management module deployed in the VNFM directly obtains the information that affects the availability state of the deployed service, or obtains, from the NFVI by using the VIM, the information that affects the availability state of the deployed service.

Specifically, after obtaining the availability state of the deployed service, the availability management module deployed in the VNFM may detect whether the availability state of the deployed service changes. If detecting that the availability state of the deployed service changes, the availability management module deployed in the VNFM may perform, based on the availability policy library and the resource information library that are deployed in the VNFM, end-to-end adjustment on the resource configured for the deployed service.

Alternatively, after the availability management module deployed in the VNFM detects the information that affects the availability state of the deployed service, the availability management module deployed in the VNFM may perform, based on the availability policy library and the resource information library that are deployed in the VNFM, end-to-end adjustment on the resource configured for the deployed service.

It should be noted that for specific descriptions about parameters in step 701 to step 705 and step 801 in this embodiment of the present invention, refer to specific descriptions about the corresponding parameters in step 101 to step 103 and step 201 in the another embodiment of the present invention. Details are not described herein again in this embodiment of the present invention.

According to the service availability management method provided in embodiments of the present invention, availability-related parameter information of a resource corresponding to a service availability level of a to-be-deployed service is determined from a preconfigured availability policy library according to the obtained service availability level of the to-be-deployed service, where the preconfigured availability policy library includes at least one service availability level and availability-related parameter information of a resource corresponding to each service availability level; and then the resource corresponding to the service availability level of the to-be-deployed service is allocated and configured for the to-be-deployed service based on a resource information library and according to the determined availability-related parameter information of the resource corresponding to the service availability level of the to-be-deployed service. The availability policy library may be used to allocate and configure, for the to-be-deployed service, at least one of the following corresponding resources: an infrastructure resource, a non-HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource. Therefore, a service availability level that a resource allocated to a service of a corresponding type can actually provide is as consistent as possible with a service availability level required by an operator, and service availability experience is ensured to the greatest extent.

In addition, when it is detected that an availability state of a deployed service changes or when information that affects an availability state of a deployed service is detected, end-to-end adjustment may be performed, based on the availability policy library and the resource information library, on a resource configured for the deployed service, so as to ensure service availability experience of a service corresponding to a high service availability level.

Figure 13:
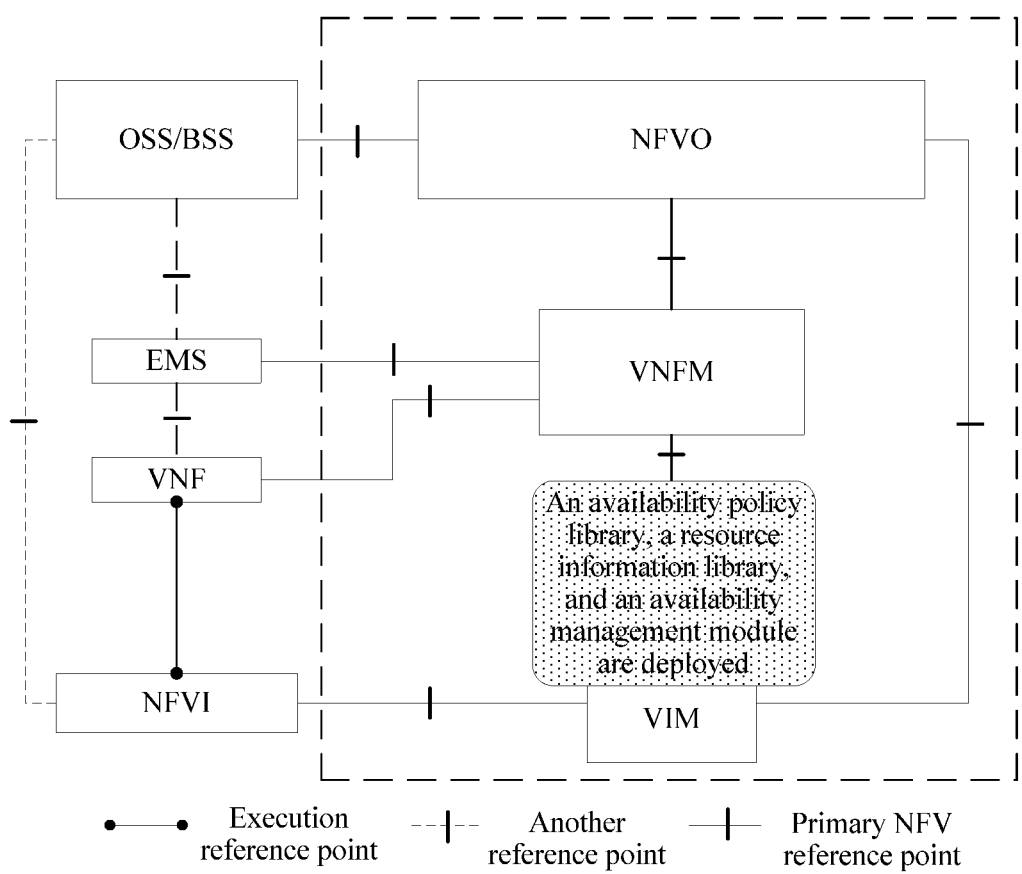
FIG. 13 is a schematic diagram of an NFV architecture according to another embodiment of the present invention.

Another embodiment of the present invention provides another service availability management method, which is applied to an NFV architecture shown in FIG. 13. The NFV architecture includes function objects such as an OSS/a BSS, an EMS, a VNF, an NFVI, an NFVO, a VNFM, and a VIM. As shown in FIG. 13, an availability management module, an availability policy library, and a resource information library are deployed in the VIM.

Figures 14, 15:
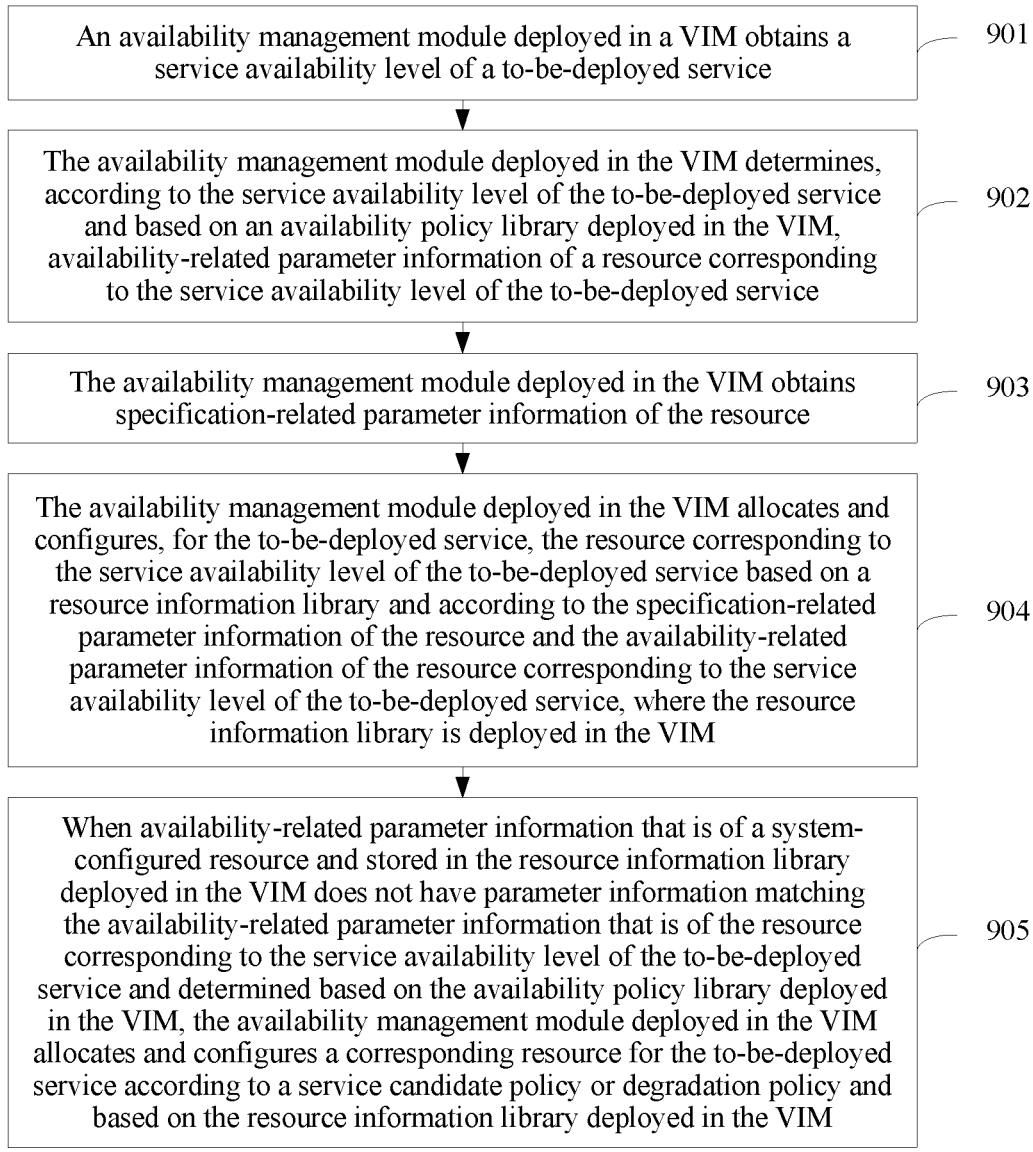
FIG. 14 is a flowchart of a service availability management method according to another embodiment of the present invention.
FIG. 15 is a flowchart of a service availability management method according to another embodiment of the present invention.

In this case, as shown in FIG. 14, in a service deployment phase, the service availability management method may include the following steps.

901. An availability management module deployed in a VIM obtains a service availability level of a to-be-deployed service.

The availability management module deployed in the VIM may obtain, from the VNFM, the service availability level of the to-be-deployed service.

902. The availability management module deployed in the VIM determines, according to the service availability level of the to-be-deployed service and based on an availability policy library deployed in the VIM, availability-related parameter information of a resource corresponding to the service availability level of the to-be-deployed service.

Specifically, after the availability management module deployed in the VIM obtains the service availability level of the to-be-deployed service, the availability management module deployed in the VIM may determine, based on the availability policy library deployed in the VIM, the availability-related parameter information of the resource corresponding to the service availability level of the to-be-deployed service.

Further, the availability policy library may be further configured to store a service candidate policy or degradation policy.

903. The availability management module deployed in the VIM obtains specification-related parameter information of the resource.

For example, the availability management module deployed in the VIM may obtain, from the VNFM, the specification-related parameter information of the resource, or may obtain, from another function module of the availability management module deployed in the VIM, the specification-related parameter information of the resource.

904. The availability management module deployed in the VIM allocates and configures, for the to-be-deployed service, the resource corresponding to the service availability level of the to-be-deployed service based on a resource information library and according to the specification-related parameter information of the resource and the availability-related parameter information of the resource corresponding to the service availability level of the to-be-deployed service, where the resource information library is deployed in the VIM.

Specifically, after the availability management module deployed in the VIM determines the availability-related parameter information of the resource corresponding to the service availability level of the to-be-deployed service, and obtains the specification-related parameter information of the resource, the availability management module deployed in the VIM may allocate and configure, for the to-be-deployed service by using an interface of the VIM, the resource corresponding to the service availability level of the to-be-deployed service based on the resource information library deployed in the VIM, and according to the specification-related parameter information of the resource and the availability-related parameter information of the resource corresponding to the service availability level of the to-be-deployed service.

905. When availability-related parameter information that is of a system-configured resource and stored in the resource information library deployed in the VIM does not have parameter information matching the availability-related parameter information that is of the resource corresponding to the service availability level of the to-be-deployed service and determined based on the availability policy library deployed in the VIM, the availability management module deployed in the VIM allocates and configures a corresponding resource for the to-be-deployed service according to a service candidate policy or degradation policy and based on the resource information library deployed in the VIM.

After the availability management module deployed in the VIM determines the availability-related parameter information of the resource corresponding to the service availability level of the to-be-deployed service, and obtains the specification-related parameter information of the resource, if the availability-related parameter information that is of the system-configured resource and stored in the resource information library deployed in the VIM does not have the parameter information matching the determined availability-related parameter information of the resource corresponding to the service availability level of the to-be-deployed service, the availability management module deployed in the VIM may allocate and configure the corresponding resource for the to-be-deployed service by using the interface of the VIM, based on the resource information library deployed in the VIM, and according to the specification-related parameter information of the resource, the service candidate policy or degradation policy, and the availability-related parameter information of the resource corresponding to the service availability level of the to-be-deployed service.

In this case, as shown in FIG. 15, in a service running phase, the service availability management method may include the following step:

1001. When detecting information that affects an availability state of a deployed service, an availability management module deployed in a VIM performs, based on an availability policy library and a resource information library that are deployed in the VIM, end-to-end adjustment on a resource configured for the deployed service.

The availability management module deployed in the VIM may obtain, from the NFVI, the information that affects the availability state of the deployed service.

Specifically, after the availability management module deployed in the VIM detects the information that affects the availability state of the deployed service, the availability management module deployed in the VIM may perform, based on the availability policy library and the resource information library that are deployed in the VIM, end-to-end adjustment on the resource configured for the deployed service.

It should be noted that for specific descriptions about parameters in step 901 to step 905 and step 1001 in this embodiment of the present invention, refer to specific descriptions about the corresponding parameters in step 101 to step 103 and step 201 in the another embodiment of the present invention. Details are not described herein again in this embodiment of the present invention.

According to the service availability management method provided in embodiments of the present invention, availability-related parameter information of a resource corresponding to a service availability level of a to-be-deployed service is determined from a preconfigured availability policy library according to the obtained service availability level of the to-be-deployed service, where the preconfigured availability policy library includes at least one service availability level and availability-related parameter information of a resource corresponding to each service availability level; and then the resource corresponding to the service availability level of the to-be-deployed service is allocated and configured for the to-be-deployed service based on a resource information library and according to the determined availability-related parameter information of the resource corresponding to the service availability level of the to-be-deployed service. The availability policy library may be used to allocate and configure, for the to-be-deployed service, at least one of the following corresponding resources: an infrastructure resource, a non-HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource. Therefore, a service availability level that a resource allocated to a service of a corresponding type can actually provide is as consistent as possible with a service availability level required by an operator, and service availability experience is ensured to the greatest extent.

In addition, when it is detected that an availability state of a deployed service changes or when information that affects an availability state of a deployed service is detected, end-to-end adjustment may be performed, based on the availability policy library and the resource information library, on a resource configured for the deployed service, so as to ensure service availability experience of a service corresponding to a high service availability level.

Figure 16:
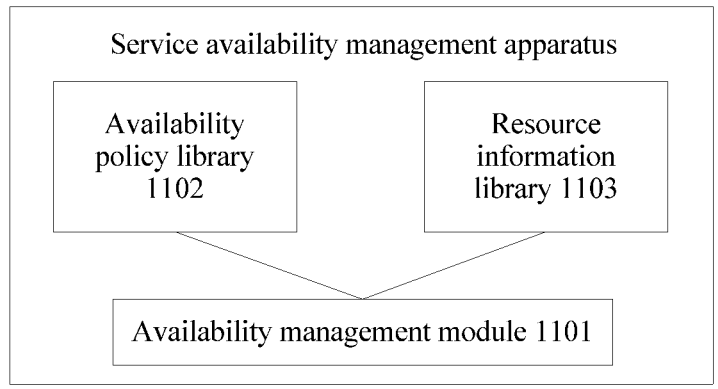
FIG. 16 is a schematic composition diagram of a service availability management apparatus according to another embodiment of the present invention.

Another embodiment of the present invention provides a service availability management apparatus. As shown in FIG. 16, the service availability management apparatus may include an availability management module 1101, an availability policy library 1102, and a resource information library 1103.

The availability management module 1101 is configured to: obtain a service availability level of a to-be-deployed service, where the service availability level is determined according to a service type of the to-be-deployed service, or the service availability level is determined according to a user type corresponding to the to-be-deployed service; determine, based on the availability policy library 1102 and according to the service availability level of the to-be-deployed service, availability-related parameter information of a resource corresponding to the service availability level of the to-be-deployed service; and allocate and configure, for the to-be-deployed service, the resource corresponding to the service availability level of the to-be-deployed service based on the resource information library 1103 and according to the availability-related parameter information of the resource corresponding to the service availability level of the to-be-deployed service.

The availability policy library 1102 is configured to store an availability policy. The availability policy includes at least one service availability level and availability-related parameter information of a resource corresponding to each service availability level.

The resource information library 1103 is configured to store availability-related parameter information of a system-configured resource. The resource includes at least one of the following: an infrastructure resource, a non-high availability HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource.

In this embodiment of the present invention, the availability management module 1101 is further configured to obtain specification-related parameter information of the resource before allocating and configuring, for the to-be-deployed service, the resource corresponding to the service availability level of the to-be-deployed service based on the resource information library 1103 and according to the availability-related parameter information of the resource corresponding to the service availability level of the to-be-deployed service. The specification-related parameter information of the resource includes at least one of the following: a resource quantity or resource performance.

The availability management module 1101 is specifically configured to allocate and configure, for the to-be-deployed service, the resource corresponding to the service availability level of the to-be-deployed service based on the resource information library 1103 and according to the specification-related parameter information of the resource and the availability-related parameter information of the resource corresponding to the service availability level of the to-be-deployed service.

In this embodiment of the present invention, further, reliability of an infrastructure resource corresponding to a high service availability level is higher than reliability of an infrastructure resource corresponding to a low service availability level.

Reliability of a non-HA software resource corresponding to a high service availability level is higher than reliability of a non-HA software resource corresponding to a low service availability level.

A quantity of function types of an HA software resource corresponding to a high service availability level is greater than a quantity of function types of an HA software resource corresponding to a low service availability level, and/or performance of a function of an HA software resource corresponding to a high service availability level is better than performance of the same function of an HA software resource corresponding to a low service availability level. The function types of the HA software resource include a fault detection function, a fault analysis function, a prediction and prevention function, an enhanced fault recovery function, a flow control function, a disaster recovery failover function, a data backup function, a software hitless upgrade function, and a software gray upgrade function.

In this embodiment of the present invention, further, availability-related parameter information that is of the infrastructure resource and stored in the availability policy library 1102 or the resource information library 1103 includes at least one of the following: a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource.

Availability-related parameter information that is of the non-HA software resource and stored in the availability policy library 1102 or the resource information library 1103 includes at least one of the following: a manufacturer of the non-HA software resource, a version of the non-HA software resource, a redundancy quantity or ratio of the non-HA software resource, or anti-affinity of the non-HA software resource. The non-HA software resource includes a service chain, a virtualized network function VNF, and a virtualized network function component VNFC.

Availability-related parameter information that is of the HA software resource and stored in the availability policy library 1102 or the resource information library 1103 includes at least one of the following: a function type of the HA software resource or function parameter configuration of the HA software resource.

In this embodiment of the present invention, further, the enhanced reliability feature of the hardware resource includes at least one of the following: a central processing unit CPU hot swap, a CPU enhanced fault detection and recovery function, a memory error checking and correction ECC check, a storage disk array RAID, power redundancy, or fan redundancy.

In this embodiment of the present invention, the availability policy library 1102 is further configured to store a service candidate policy or degradation policy.

The availability management module 1101 is further configured to allocate and configure a corresponding resource for the to-be-deployed service based on the resource information library 1103 and according to the service candidate policy or degradation policy when the availability-related parameter information that is of the system-configured resource and stored in the resource information library 1103 does not have parameter information matching the availability-related parameter information that is of the resource corresponding to the service availability level of the to-be-deployed service and determined based on the availability policy library 1102.

It should be noted that for a specific working process of function modules in the service availability management apparatus provided in this embodiment of the present invention, refer to specific descriptions of the corresponding process in the method embodiment. Details are not described again in this embodiment of the present invention.

According to the service availability management apparatus provided in embodiments of the present invention, availability-related parameter information of a resource corresponding to a service availability level of a to-be-deployed service is determined from a preconfigured availability policy library according to the obtained service availability level of the to-be-deployed service, where the preconfigured availability policy library includes at least one service availability level and availability-related parameter information of a resource corresponding to each service availability level; and then the resource corresponding to the service availability level of the to-be-deployed service is allocated and configured for the to-be-deployed service based on a resource information library and according to the determined availability-related parameter information of the resource corresponding to the service availability level of the to-be-deployed service. The availability policy library may be used to allocate and configure, for the to-be-deployed service, at least one of the following corresponding resources: an infrastructure resource, a non-HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource. Therefore, a service availability level that a resource allocated to a service of a corresponding type can actually provide is as consistent as possible with a service availability level required by an operator, and service availability experience is ensured to the greatest extent.

Figure 17:
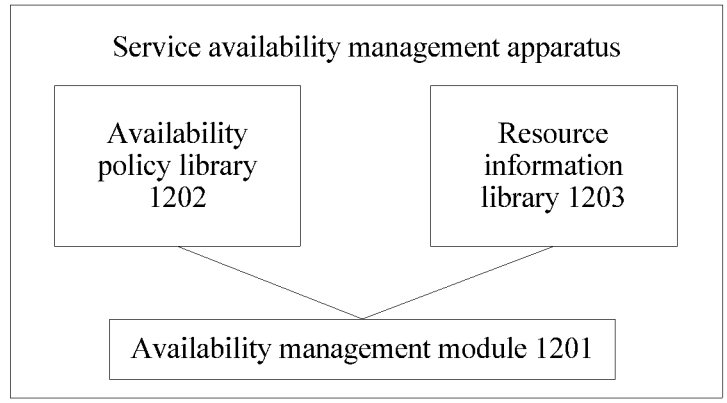
FIG. 17 is a schematic composition diagram of a service availability management apparatus according to another embodiment of the present invention.

Another embodiment of the present invention provides a service availability management apparatus. As shown in FIG. 17, the service availability management apparatus may include an availability management module 1201, an availability policy library 1202, and a resource information library 1203.

The availability management module 1201 is configured to: when detecting that an availability state of a deployed service changes or when detecting information that affects an availability state of the deployed service, perform, based on the availability policy library 1202 and the resource information library 1203, end-to-end adjustment on a resource configured for the deployed service.

The availability policy library 1202 is configured to store an availability policy. The availability policy includes at least one service availability level and availability-related parameter information of a resource corresponding to each service availability level. The service availability level is determined according to a service type of the service, or the service availability level is determined according to a user type corresponding to the service.

The resource information library 1203 is configured to store availability-related parameter information of a system-configured resource. The resource includes at least one of the following: an infrastructure resource, a non-high availability HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource.

In this embodiment of the present invention, further, reliability of an infrastructure resource corresponding to a high service availability level is higher than reliability of an infrastructure resource corresponding to a low service availability level.

Reliability of a non-HA software resource corresponding to a high service availability level is higher than reliability of a non-HA software resource corresponding to a low service availability level.

A quantity of function types of an HA software resource corresponding to a high service availability level is greater than a quantity of function types of an HA software resource corresponding to a low service availability level, and/or performance of a function of an HA software resource corresponding to a high service availability level is better than performance of the same function of an HA software resource corresponding to a low service availability level. The function types of the HA software resource include a fault detection function, a fault analysis function, a prediction and prevention function, an enhanced fault recovery function, a flow control function, a disaster recovery failover function, a data backup function, a software hitless upgrade function, and a software gray upgrade function.

In this embodiment of the present invention, further, availability-related parameter information that is of the infrastructure resource and stored in the availability policy library 1202 or the resource information library 1203 includes at least one of the following: a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource.

Availability-related parameter information that is of the non-HA software resource and stored in the availability policy library 1202 or the resource information library 1203 includes at least one of the following: a manufacturer of the non-HA software resource, a version of the non-HA software resource, a redundancy quantity or ratio of the non-HA software resource, or anti-affinity of the non-HA software resource. The non-HA software resource includes a service chain, a virtualized network function VNF, and a virtualized network function component VNFC.

Availability-related parameter information that is of the HA software resource and stored in the availability policy library 1202 or the resource information library 1203 includes at least one of the following: a function type of the HA software resource or function parameter configuration of the HA software resource.

In this embodiment of the present invention, further, the enhanced reliability feature of the hardware resource includes at least one of the following: a central processing unit CPU hot swap, a CPU enhanced fault detection and recovery function, a memory error checking and correction ECC check, a storage disk array RAID, power redundancy, or fan redundancy.

In this embodiment of the present invention, further, that an availability state of a deployed service changes includes at least one of the following: a key performance indicator KPI of the deployed service changes. That a KPI of the deployed service changes includes at least one of the following: a service flow of the deployed service changes, a service user quantity of the deployed service changes, a service ratio of the deployed service changes, a service success rate of the deployed service changes, a service access delay of the deployed service changes, or a service processing time of the deployed service changes.

The information that affects the availability state of the deployed service includes: a system resource changes. That a system resource changes includes at least one of the following: the non-HA software resource is upgraded, the HA software resource is upgraded, a new infrastructure resource is added, the infrastructure resource encounters a fault, a new non-HA software resource is added, a new HA software resource is added, parameter configuration of the HA software resource is adjusted, a network packet loss rate changes, or a network delay changes.

It should be noted that for a specific working process of function modules in the service availability management apparatus provided in this embodiment of the present invention, refer to specific descriptions of the corresponding process in the method embodiment. Details are not described again in this embodiment of the present invention.

According to the service availability management apparatus provided in embodiments of the present invention, when it is detected that an availability state of a deployed service changes or when information that affects an availability state of a deployed service is detected, end-to-end adjustment may be performed, based on an availability policy library and a resource information library, on a resource configured for the deployed service, so as to ensure service availability experience of a service corresponding to a high service availability level.

Figure 18:
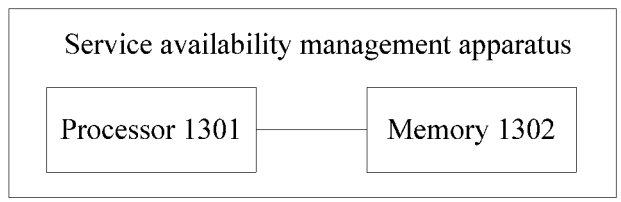
FIG. 18 is a schematic composition diagram of a service availability management apparatus according to another embodiment of the present invention.

Another embodiment of the present invention provides a service availability management apparatus. As shown in FIG. 18, the service availability management apparatus may include a processor 1301 and a memory 1302.

The processor 1301 is configured to: obtain a service availability level of a to-be-deployed service, where the service availability level is determined according to a service type of the to-be-deployed service, or the service availability level is determined according to a user type corresponding to the to-be-deployed service; determine, based on the memory 1302 and according to the service availability level of the to-be-deployed service, availability-related parameter information of a resource corresponding to the service availability level of the to-be-deployed service; and allocate and configure, for the to-be-deployed service, the resource corresponding to the service availability level of the to-be-deployed service based on the memory 1302 and according to the availability-related parameter information of the resource corresponding to the service availability level of the to-be-deployed service.

The memory 1302 is configured to store an availability policy. The availability policy includes at least one service availability level and availability-related parameter information of a resource corresponding to each service availability level.

The memory 1302 is further configured to store availability-related parameter information of a system-configured resource. The resource includes at least one of the following: an infrastructure resource, a non-high availability HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource.

In this embodiment of the present invention, the processor 1301 is further configured to obtain specification-related parameter information of the resource before allocating and configuring, for the to-be-deployed service, the resource corresponding to the service availability level of the to-be-deployed service based on the memory 1302 and according to the availability-related parameter information of the resource corresponding to the service availability level of the to-be-deployed service. The specification-related parameter information of the resource includes at least one of the following: a resource quantity or resource performance.

The processor 1301 is specifically configured to allocate and configure, for the to-be-deployed service, the resource corresponding to the service availability level of the to-be-deployed service based on the memory 1302 and according to the specification-related parameter information of the resource and the availability-related parameter information of the resource corresponding to the service availability level of the to-be-deployed service.

In this embodiment of the present invention, further, reliability of an infrastructure resource corresponding to a high service availability level is higher than reliability of an infrastructure resource corresponding to a low service availability level.

Reliability of a non-HA software resource corresponding to a high service availability level is higher than reliability of a non-HA software resource corresponding to a low service availability level.

A quantity of function types of an HA software resource corresponding to a high service availability level is greater than a quantity of function types of an HA software resource corresponding to a low service availability level, and/or performance of a function of an HA software resource corresponding to a high service availability level is better than performance of the same function of an HA software resource corresponding to a low service availability level. The function types of the HA software resource include a fault detection function, a fault analysis function, a prediction and prevention function, an enhanced fault recovery function, a flow control function, a disaster recovery failover function, a data backup function, a software hitless upgrade function, and a software gray upgrade function.

In this embodiment of the present invention, availability-related parameter information that is of the infrastructure resource and stored in memory 1302 includes at least one of the following: a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource.

Availability-related parameter information that is of the non-HA software resource and stored in the memory 1302 includes at least one of the following: a manufacturer of the non-HA software resource, a version of the non-HA software resource, a redundancy quantity or ratio of the non-HA software resource, or anti-affinity of the non-HA software resource. The non-HA software resource includes a service chain, a virtualized network function VNF, and a virtualized network function component VNFC.

Availability-related parameter information that is of the HA software resource and stored in the memory 1302 includes at least one of the following: a function type of the HA software resource or function parameter configuration of the HA software resource.

In this embodiment of the present invention, further, the enhanced reliability feature of the hardware resource includes at least one of the following: a central processing unit CPU hot swap, a CPU enhanced fault detection and recovery function, a memory error checking and correction ECC check, a storage disk array RAID, power redundancy, or fan redundancy.

In this embodiment of the present invention, the memory 1302 is further configured to store a service candidate policy or degradation policy.

The processor 1301 is further configured to allocate and configure a corresponding resource for the to-be-deployed service based on the memory 1302 and according to the service candidate policy or degradation policy when the availability-related parameter information that is of the system-configured resource and stored in the memory 1302 does not have parameter information matching the availability-related parameter information that is of the resource corresponding to the service availability level of the to-be-deployed service and determined based on the memory 1302.

It should be noted that for a specific working process of function modules in the service availability management apparatus provided in this embodiment of the present invention, refer to specific descriptions of the corresponding process in the method embodiment. Details are not described again in this embodiment of the present invention.

According to the service availability management apparatus provided in an embodiment of the present invention, availability-related parameter information of a resource corresponding to a service availability level of a to-be-deployed service is determined from a preconfigured availability policy library according to the obtained service availability level of the to-be-deployed service, where the preconfigured availability policy library includes at least one service availability level and availability-related parameter information of a resource corresponding to each service availability level; and then the resource corresponding to the service availability level of the to-be-deployed service is allocated and configured for the to-be-deployed service based on a resource information library and according to the determined availability-related parameter information of the resource corresponding to the service availability level of the to-be-deployed service. The availability policy library may be used to allocate and configure, for the to-be-deployed service, at least one of the following corresponding resources: an infrastructure resource, a non-HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource. Therefore, a service availability level that a resource allocated to a service of a corresponding type can actually provide is as consistent as possible with a service availability level required by an operator, and service availability experience is ensured to the greatest extent.

Figure 19:
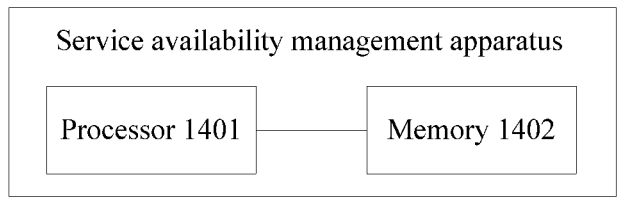
FIG. 19 is a schematic composition diagram of a service availability management apparatus according to another embodiment of the present invention.

Another embodiment of the present invention provides a service availability management apparatus. As shown in FIG. 19, the service availability management apparatus includes a processor 1401 and a memory 1402.

The processor 1401 is configured to: when detecting that an availability state of a deployed service changes or when detecting information that affects an availability state of the deployed service, perform, based on the memory 1402, end-to-end adjustment on a resource configured for the deployed service.

The memory 1402 is configured to store an availability policy. The availability policy includes at least one service availability level and availability-related parameter information of a resource corresponding to each service availability level. The service availability level is determined according to a service type of the service, or the service availability level is determined according to a user type corresponding to the service.

The memory 1402 is further configured to store availability-related parameter information of a system-configured resource. The resource includes at least one of the following: an infrastructure resource, a non-high availability HA software resource, or an HA software resource. The infrastructure resource includes a hardware resource, a virtualization platform, a virtual unit, and a virtual resource. The hardware resource includes a computing hardware resource, a storage hardware resource, and a network hardware resource. The virtual resource includes a virtual computing resource, a virtual storage resource, and a virtual network resource.

In this embodiment of the present invention, further, reliability of an infrastructure resource corresponding to a high service availability level is higher than reliability of an infrastructure resource corresponding to a low service availability level.

Reliability of a non-HA software resource corresponding to a high service availability level is higher than reliability of a non-HA software resource corresponding to a low service availability level.

A quantity of function types of an HA software resource corresponding to a high service availability level is greater than a quantity of function types of an HA software resource corresponding to a low service availability level, and/or performance of a function of an HA software resource corresponding to a high service availability level is better than performance of the same function of an HA software resource corresponding to a low service availability level. The function types of the HA software resource include a fault detection function, a fault analysis function, a prediction and prevention function, an enhanced fault recovery function, a flow control function, a disaster recovery failover function, a data backup function, a software hitless upgrade function, and a software gray upgrade function.

In this embodiment of the present invention, availability-related parameter information that is of the infrastructure resource and stored in memory 1402 includes at least one of the following: a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource.

Availability-related parameter information that is of the non-HA software resource and stored in the memory 1402 includes at least one of the following: a manufacturer of the non-HA software resource, a version of the non-HA software resource, a redundancy quantity or ratio of the non-HA software resource, or anti-affinity of the non-HA software resource; and the non-HA software resource includes a service chain, a virtualized network function VNF, and a virtualized network function component VNFC.

Availability-related parameter information that is of the HA software resource and stored in the memory 1402 includes at least one of the following: a function type of the HA software resource or function parameter configuration of the HA software resource.

In this embodiment of the present invention, further, the enhanced reliability feature of the hardware resource includes at least one of the following: a central processing unit CPU hot swap, a CPU enhanced fault detection and recovery function, a memory error checking and correction ECC check, a storage disk array RAID, power redundancy, or fan redundancy.

In this embodiment of the present invention, further, that an availability state of a deployed service changes includes at least one of the following: a key performance indicator KPI of the deployed service changes. That a KPI of the deployed service changes includes at least one of the following: a service flow of the deployed service changes, a service user quantity of the deployed service changes, a service ratio of the deployed service changes, a service success rate of the deployed service changes, a service access delay of the deployed service changes, or a service processing time of the deployed service changes.

The information that affects the availability state of the deployed service includes: a system resource changes. That a system resource changes includes at least one of the following: the non-HA software resource is upgraded, the HA software resource is upgraded, a new infrastructure resource is added, the infrastructure resource encounters a fault, a new non-HA software resource is added, a new HA software resource is added, parameter configuration of the HA software resource is adjusted, a network packet loss rate changes, or a network delay changes.

It should be noted that for a specific working process of function modules in the service availability management apparatus provided in this embodiment of the present invention, refer to specific descriptions of the corresponding process in the method embodiment. Details are not described again in this embodiment of the present invention.

According to the service availability management apparatus provided in embodiments of the present invention, when it is detected that an availability state of a deployed service changes or when information that affects an availability state of a deployed service is detected, end-to-end adjustment may be performed, based on an availability policy library and a resource information library, on a resource configured for the deployed service, so as to ensure service availability experience of a service corresponding to a high service availability level.

The foregoing descriptions about implementation manners may allow a person skilled in the art to understand that, for convenient and brief description, only division of the foregoing function modules is taken as an example for illustration. In actual application, the foregoing functions can be allocated to different function modules for implementation according to requirements, that is, an inner structure of an apparatus is divided into different function modules to implement all or some of the functions described above.

In the several embodiments provided in the present application, it should be understood that the disclosed apparatus and method may be implemented in other manners. For example, the described apparatus embodiments are merely examples. For example, the module or unit division is merely logical function division, and there may be another division manner in actual implementation. For example, multiple units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate. Parts displayed as units may be one or more physical units, that is, may be located in one place, or may be distributed on multiple different places. Some or all of the units may be selected according to actual requirements to achieve the objectives of the solutions of the embodiments.

In addition, function units in the embodiments of the present invention may be integrated into one processing unit, or each unit may exist alone physically, or two or more units are integrated into one unit. The integrated unit may be implemented in a form of hardware, or may be implemented in a form of a software function unit.

When being implemented in a form of a software function unit and sold or used as an independent product, the integrated unit may be stored in a readable storage medium. Based on such an understanding, the technical solutions of the present invention essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of the present invention. The foregoing storage medium includes any medium that can store program code, such as a USB flash drive, a removable hard disk, a read-only memory (ROM for short), a random access memory (RAM for short), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    obtaining a service availability level of a to-be-deployed service, wherein the service availability level is determined according to a service type of the to-be-deployed service, or the service availability level is determined according to a user type corresponding to the to-be-deployed service;
    determining, based on an availability policy library and according to the service availability level of the to-be-deployed service, availability-related parameter information of a resource corresponding to the service availability level of the to-be-deployed service; and
    allocating and configuring, for the to-be-deployed service, the resource corresponding to the service availability level of the to-be-deployed service based on a resource information library and according to the availability-related parameter information of the resource corresponding to the service availability level of the to-be-deployed service;
    wherein the availability policy library stores an availability policy, and the availability policy comprises at least one service availability level and availability-related parameter information of a resource corresponding to each service availability level;
    wherein the resource information library stores availability-related parameter information of a system-configured resource, and the system-configured resource comprises: an infrastructure resource, a non-high availability (HA) software resource, or an HA software resource; and
    wherein the infrastructure resource comprises a hardware resource, a virtualization platform, a virtual unit, and a virtual resource, the hardware resource comprises a computing hardware resource, a storage hardware resource, and a network hardware resource, and the virtual resource comprises a virtual computing resource, a virtual storage resource, and a virtual network resource.

2. The method according to claim 1, wherein before allocating and configuring, for the to-be-deployed service, the resource corresponding to the service availability level of the to-be-deployed service based on the resource information library and according to the availability-related parameter information of the resource corresponding to the service availability level of the to-be-deployed service, the method further comprises:
obtaining specification-related parameter information of the resource, wherein the specification-related parameter information of the resource comprises a resource quantity or resource performance; and
wherein allocating and configuring, for the to-be-deployed service, the resource corresponding to the service availability level of the to-be-deployed service based on the resource information library and according to the availability-related parameter information of the resource corresponding to the service availability level of the to-be-deployed service comprises:
allocating and configuring, for the to-be-deployed service, the resource corresponding to the service availability level of the to-be-deployed service based on the resource information library and according to the specification-related parameter information of the resource and the availability-related parameter information of the resource corresponding to the service availability level of the to-be-deployed service.

3. The method according to claim 1, wherein the availability-related parameter information of the infrastructure resource comprises: a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource;
wherein the availability-related parameter information of the non-HA software resource comprises: a manufacturer of the non-HA software resource, a version of the non-HA software resource, a redundancy quantity or ratio of the non-HA software resource, or anti-affinity of the non-HA software resource, and the non-HA software resource comprises: a service chain, a virtualized network function (VNF), and a virtualized network function component (VNFC); and
wherein the availability-related parameter information of the HA software resource comprises a function type of the HA software resource or function parameter configuration of the HA software resource.

4. The method according to claim 1, wherein the availability policy library further stores a service candidate policy or degradation policy; and
wherein the method further comprises:
allocating and configuring a another resource for the to-be-deployed service based on the resource information library and according to the service candidate policy or degradation policy when the availability-related parameter information that is of the system-configured resource and stored in the resource information library does not have parameter information matching the availability-related parameter information that is of the resource corresponding to the service availability level of the to-be-deployed service and determined based on the availability policy library.

5. A method, comprising:
when it is detected that an availability state of a deployed service changes, or when information that affects an availability state of the deployed service is detected, performing, based on an availability policy library and a resource information library, end-to-end adjustment on a resource configured for the deployed service;
wherein the availability policy library stores an availability policy, the availability policy comprises at least one service availability level and availability-related parameter information of a resource corresponding to each service availability level, and a service availability level of the deployed service is determined according to a service type of the deployed service, or the service availability level of the deployed service is determined according to a user type corresponding to the deployed service;
wherein the resource information library stores availability-related parameter information of a system-configured resource, the system-configured resource comprises: an infrastructure resource, a non-high availability (HA) software resource, or a HA software resource; and
wherein the infrastructure resource comprises a hardware resource, a virtualization platform, a virtual unit, and a virtual resource, the hardware resource comprises a computing hardware resource, a storage hardware resource, and a network hardware resource, and the virtual resource comprises a virtual computing resource, a virtual storage resource, and a virtual network resource.

6. The method according to claim 5, wherein the availability-related parameter information of the infrastructure resource comprises a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource;
wherein the availability-related parameter information of the non-HA software resource comprises: a manufacturer of the non-HA software resource, a version of the non-HA software resource, a redundancy quantity or ratio of the non-HA software resource, or anti-affinity of the non-HA software resource, and the non-HA software resource comprises a service chain, a virtualized network function (VNF), and a virtualized network function component (VNFC); and
wherein the availability-related parameter information of the HA software resource comprises: a function type of the HA software resource or function parameter configuration of the HA software resource.

7. The method according to claim 5, wherein the availability state of the deployed service changing comprises a key performance indicator (KPI) of the deployed service changing, wherein the KPI of the deployed service changing comprises: a service flow of the deployed service changing, a service user quantity of the deployed service changing, a service ratio of the deployed service changing, a service success rate of the deployed service changing, a service access delay of the deployed service changing, or a service processing time of the deployed service changing; and
wherein the information that affects the availability state of the deployed service comprises a system resource change, wherein the system resource change comprises: the non-high availability (HA) software resource being upgraded, the HA software resource being upgraded, a new infrastructure resource being added, the infrastructure resource encountering a fault, a new non-HA software resource being added, a new HA software resource being added, parameter configuration of the HA software resource being adjusted, a network packet loss rate changing, or a network delay changing.

8. An apparatus, comprising:
a processor; and
a non-transitory computer-readable storage medium storing a program to be executed by the processor, the program including instructions for:
  obtaining a service availability level of a to-be-deployed service, where the service availability level is determined according to a service type of the to-be-deployed service, or the service availability level is determined according to a user type corresponding to the to-be-deployed service;
  determining, based on an availability policy library and according to the service availability level of the to-be-deployed service, availability-related parameter information of a resource corresponding to the service availability level of the to-be-deployed service; and
  allocating and configuring, for the to-be-deployed service, the resource corresponding to the service availability level of the to-be-deployed service based on a resource information library and according to the availability-related parameter information of the resource corresponding to the service availability level of the to-be-deployed service; and
wherein the non-transitory computer-readable storage medium further stores:
  the availability policy library, wherein the availability policy library comprises an availability policy, and the availability policy comprises at least one service availability level and availability-related parameter information of a resource corresponding to each service availability level; and
  the resource information library, wherein the resource information library comprises availability-related parameter information of a system-configured resource, and wherein the system-configured resource comprises: an infrastructure resource, a non-high availability (HA) software resource, or an HA software resource, wherein the infrastructure resource comprises a hardware resource, a virtualization platform, a virtual unit, and a virtual resource, wherein the hardware resource comprises a computing hardware resource, a storage hardware resource, and a network hardware resource, and wherein the virtual resource comprises a virtual computing resource, a virtual storage resource, and a virtual network resource.

9. The apparatus according to claim 8, wherein the program further includes instructions for:
  before allocating and configuring, for the to-be-deployed service, the resource corresponding to the service availability level of the to-be-deployed service based on the resource information library and according to the availability-related parameter information of the resource corresponding to the service availability level of the to-be-deployed service, obtaining specification-related parameter information of the resource corresponding to the service availability level of the to-be-deployed service, wherein the specification-related parameter information of the resource corresponding to the service availability level of the to-be-deployed service comprises a resource quantity or resource performance; and
  allocating and configuring, for the to-be-deployed service, the resource corresponding to the service availability level of the to-be-deployed service based on the resource information library and according to the specification-related parameter information of the resource corresponding to the service availability level of the to-be-deployed service and the availability-related parameter information of the resource corresponding to the service availability level of the to-be-deployed service.

10. The apparatus according to claim 8, wherein:
reliability of an infrastructure resource corresponding to a high service availability level is higher than reliability of an infrastructure resource corresponding to a low service availability level;
reliability of a non-HA software resource corresponding to a high service availability level is higher than reliability of a non-HA software resource corresponding to a low service availability level; and
a quantity of function types of an HA software resource corresponding to a high service availability level is greater than a quantity of function types of an HA software resource corresponding to a low service availability level, or performance of a function of an HA software resource corresponding to a high service availability level is better than performance of the same function of an HA software resource corresponding to a low service availability level, and wherein function types of the HA software resource comprise a fault detection function, a fault analysis function, a prediction and prevention function, an enhanced fault recovery function, a flow control function, a disaster recovery failover function, a data backup function, a software hitless upgrade function, and a software gray upgrade function.

11. The apparatus according to claim 8, wherein the availability-related parameter information of the infrastructure resource comprises: a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource;
  wherein the availability-related parameter information of the non-HA software resource comprises: a manufacturer of the non-HA software resource, a version of the non-HA software resource, a redundancy quantity or ratio of the non-HA software resource, or anti-affinity of the non-HA software resource, wherein the non-HA software resource comprises a service chain, a virtualized network function (VNF), and a virtualized network function component (VNFC); and
  wherein the availability-related parameter information of the HA software resource comprises: a function type of the HA software resource or function parameter configuration of the HA software resource.

12. The apparatus according to claim 11, wherein the enhanced reliability feature of the hardware resource comprises: a central processing unit (CPU) hot swap, a CPU enhanced fault detection and recovery function, a memory error checking and correction (ECC) check, a storage disk array (RAID), power redundancy, or fan redundancy.

13. The apparatus according to claim 8, wherein the non-transitory computer-readable storage medium is further configured to store a service candidate policy or degradation policy, and the program further includes instructions for:
allocating and configuring another resource for the to-be-deployed service based on the resource information library and according to the service candidate policy or degradation policy when the availability-related parameter information of the system-configured resource does not have parameter information matching the availability-related parameter information of the resource corresponding to the service availability level of the to-be-deployed service.

14. An apparatus, comprising:
a processor; and
a non-transitory computer-readable storage medium storing a program to be executed by the processor, the program including instructions for:
when it is detected that an availability state of a deployed service changes, or when information that affects an availability state of the deployed service is detected, performing, based on an availability policy library and a resource information library, end-to-end adjustment on a resource configured for the deployed service; and
wherein the non-transitory computer-readable storage medium further stores:
the availability policy library, wherein the availability policy library comprises an availability policy, and the availability policy comprises at least one service availability level and availability-related parameter information of a resource corresponding to each service availability level, and the service availability level of the deployed service is determined according to a service type of the deployed service, or the service availability level of the deployed service is determined according to a user type corresponding to the deployed service; and
the resource information library, wherein the resource information library comprises availability-related parameter information of a system-configured resource, and the system-configured resource comprises: an infrastructure resource, a non-high availability (HA) software resource, or an HA software resource, wherein the infrastructure resource comprises a hardware resource, a virtualization platform, a virtual unit, and a virtual resource, wherein the hardware resource comprises a computing hardware resource, a storage hardware resource, and a network hardware resource, and wherein the virtual resource comprises a virtual computing resource, a virtual storage resource, and a virtual network resource.

15. The apparatus according to claim 14, wherein:
reliability of an infrastructure resource corresponding to a high service availability level is higher than reliability of an infrastructure resource corresponding to a low service availability level;
reliability of a non-HA software resource corresponding to a high service availability level is higher than reliability of a non-HA software resource corresponding to a low service availability level; and a quantity of function types of an HA software resource corresponding to a high service availability level is greater than a quantity of function types of an HA software resource corresponding to a low service availability level, or performance of a function of an HA software resource corresponding to a high service availability level is better than performance of the same function of an HA software resource corresponding to a low service availability level, and wherein the function types of the HA software resource comprise a fault detection function, a fault analysis function, a prediction and prevention function, an enhanced fault recovery function, a flow control function, a disaster recovery failover function, a data backup function, a software hitless upgrade function, and a software gray upgrade function.

16. The apparatus according to claim 14, wherein the availability-related parameter information of the infrastructure resource and comprises: a service life of the hardware resource, a manufacturer of the hardware resource, an enhanced reliability feature of the hardware resource, a redundancy quantity or ratio of the hardware resource, anti-affinity of the hardware resource, a manufacturer of the virtualization platform, a version of the virtualization platform, a redundancy quantity or ratio of the virtual unit, anti-affinity of the virtual unit, a redundancy quantity or ratio of the virtual resource, or anti-affinity of the virtual resource;
the availability-related parameter information of the non-HA software resource comprises: a manufacturer of the non-HA software resource, a version of the non-HA software resource, a redundancy quantity or ratio of the non-HA software resource, or anti-affinity of the non-HA software resource, and the non-HA software resource comprises a service chain, a virtualized network function (VNF), and a virtualized network function component (VNFC); and
the availability-related parameter information of the HA software resource comprises: a function type of the HA software resource or function parameter configuration of the HA software resource.

17. The apparatus according to claim 16, wherein the enhanced reliability feature of the hardware resource comprises: a central processing unit (CPU) hot swap, a CPU enhanced fault detection and recovery function, a memory error checking and correction (ECC) check, a storage disk array (RAID), power redundancy, or fan redundancy.

18. The apparatus according to claim 14, wherein:
the change of the availability state of a of the deployed service comprises: a change of a key performance indicator (KPI) of the deployed service, and the change of the KPI of the deployed service comprises: a change of a service flow of the deployed service, a change of a service user quantity of the deployed service, a change of a service ratio of the deployed service, a change of a service success rate of the deployed service, a change of a service access delay of the deployed service, or a change of a service processing time of the deployed service; and
the information that affects the availability state of the deployed service comprises: information of a change of a system resource wherein the change of the system resource comprises: the non-HA software resource is upgraded, the HA software resource is upgraded, a new infrastructure resource is added, the infrastructure resource encounters a fault, a new non-HA software resource is added, a new HA software resource is added, parameter configuration of the HA software resource is adjusted, a network packet loss rate changes, or a network delay changes.

* * * * *